(12) United States Patent
Jeong et al.

(10) Patent No.: US 11,348,201 B2
(45) Date of Patent: *May 31, 2022

(54) ELECTRONIC DEVICE HAVING ROLLABLE DISPLAY AND METHOD OF CONTROLLING THE SAME

(71) Applicant: SAMSUNG ELECTRONICS CO., LTD., Suwon-si (KR)

(72) Inventors: Hee-seok Jeong, Suwon-si (KR); Sang-young Lee, Anyang-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/215,454

(22) Filed: Mar. 29, 2021

(65) Prior Publication Data

US 2021/0217133 A1 Jul. 15, 2021

Related U.S. Application Data

(63) Continuation of application No. 15/276,991, filed on Sep. 27, 2016, now Pat. No. 10,977,771.

(Continued)

(30) Foreign Application Priority Data

Jan. 29, 2016 (KR) .................. 10-2016-0011446

(51) Int. Cl.
G06T 3/40 (2006.01)
G06F 1/16 (2006.01)
G06T 11/60 (2006.01)

(52) U.S. Cl.
CPC .............. *G06T 3/40* (2013.01); *G06F 1/1652* (2013.01); *G06F 1/1677* (2013.01); *G06T 11/60* (2013.01)

(58) Field of Classification Search
None
See application file for complete search history.

(56) References Cited

U.S. PATENT DOCUMENTS 9,019,313 B2 4/2015 Kwack et al.
9,098,241 B1 8/2015 Cho et al.
(Continued)

FOREIGN PATENT DOCUMENTS

CN 103946780 A 7/2014
CN 104424318 A 3/2015
(Continued)

OTHER PUBLICATIONS

Communication dated Jul. 16, 2018 by the European Patent Office in counterpart European Patent Application No. 16866604.8.
(Continued)

*Primary Examiner* — Frank S Chen
(74) *Attorney, Agent, or Firm* — Sughrue Mion, PLLC

(57) ABSTRACT

An electronic device and a method of controlling the electronic device are provided. The electronic device includes a housing, a roll at least partially contained in the housing, a display configured to be rolled on the roll, the display including a display area having a size that changes according to a rotation of the roll, and the display being configured to display a screen including at least one element in the display area, a sensor configured to sense the rotation of the roll, and a processor electrically connected to the display and the sensor. In response to a size of the display area being changed according to the rotation of the roll, the processor is configured to change at least one of a size and a layout of an element included in the screen according to the size of the display area.

10 Claims, 17 Drawing Sheets

Related U.S. Application Data

(60) Provisional application No. 62/256,889, filed on Nov. 18, 2015.

(56) References Cited

U.S. PATENT DOCUMENTS

| | | |
|---|---|---|
| 9,116,567 B2 | 8/2015 | Alberth, Jr. et al. |
| 10,241,542 B2 | 3/2019 | Kwak et al. |
| 10,802,544 B2 | 10/2020 | Kwak et al. |
| 2007/0058045 A1 | 3/2007 | Misawa |
| 2008/0037051 A1 | 2/2008 | Otsubo |
| 2008/0186397 A1 | 8/2008 | Kim |
| 2009/0051830 A1 | 2/2009 | Matsushita et al. |
| 2009/0184935 A1 | 7/2009 | Kim |
| 2010/0056223 A1 | 3/2010 | Choi et al. |
| 2010/0167791 A1 | 7/2010 | Lim |
| 2011/0196812 A1 | 8/2011 | Jezek |
| 2012/0280924 A1 | 11/2012 | Kummer et al. |
| 2013/0058063 A1 | 3/2013 | O'Brien |
| 2013/0127918 A1 | 5/2013 | Kang et al. |
| 2013/0201208 A1 | 8/2013 | Cho et al. |
| 2013/0321340 A1 | 12/2013 | Seo et al. |
| 2013/0328912 A1 | 12/2013 | Najarian |
| 2014/0043268 A1 | 2/2014 | Bae |
| 2014/0098028 A1 | 4/2014 | Kwak et al. |
| 2014/0118317 A1 | 5/2014 | Song et al. |
| 2014/0018722 A1 | 7/2014 | Song |
| 2014/0198057 A1 | 7/2014 | Xia et al. |
| 2014/0340299 A1 | 11/2014 | Lee et al. |
| 2015/0029229 A1 | 1/2015 | Voutsas |
| 2015/0074519 A1 | 3/2015 | He |
| 2015/0220118 A1 | 8/2015 | Kwak et al. |
| 2015/0220119 A1 | 8/2015 | Seo et al. |
| 2016/0349971 A1 | 12/2016 | Chi et al. |
| 2017/0010689 A1 | 1/2017 | Bostick et al. |
| 2017/0011714 A1 | 1/2017 | Eim et al. |
| 2018/0284964 A1 | 10/2018 | Kang et al. |
| 2019/0227599 A1 | 7/2019 | Kwak et al. |
| 2021/0026413 A1 | 1/2021 | Kwak et al. |

FOREIGN PATENT DOCUMENTS

| | | |
|---|---|---|
| CN | 104662489 A | 5/2015 |
| EP | 2 881 840 A2 | 6/2015 |
| JP | 2007-72406 A | 3/2007 |
| KR | 10-2006-0009089 A | 1/2006 |
| KR | 10-2009-0129193 A | 12/2009 |
| KR | 10-2010-0009008 A | 1/2010 |
| KR | 10-2013-0054072 A | 5/2013 |
| KR | 10-2014-0000749 A | 1/2014 |
| KR | 10-2014-0044237 A | 4/2014 |
| KR | 10-2015-0012233 A | 2/2015 |
| KR | 10-1540864 B1 | 7/2015 |
| WO | 2008/150600 A1 | 12/2008 |
| WO | 2013/077537 A1 | 5/2013 |
| WO | 2014/137019 A1 | 9/2014 |
| WO | 2014/200151 A1 | 12/2014 |

OTHER PUBLICATIONS

Search Report dated Feb. 23, 2017, issued by the International Searching Authority in International Application No. PCT/KR2016/013195 (PCT/ISA/210).
Office Action dated Oct. 7, 2019, issued by the United States Patent and Trademark Office in counterpart U.S. Appl. No. 15/775,194.
Advisory Action dated Dec. 19, 2019, issued by the United States Patent and Trademark Office in counterpart U.S. Appl. No. 15/775,194.
Office Action dated Jan. 29, 2020, issued by the United States Patent and Trademark Office in counterpart U.S. Appl. No. 15/775,194.
Communication dated Jul. 31, 2020 issued by the State Intellectual Property Office of P R. China in counterpart Chinese Application No. 201680067215.2.
Communication dated Jul. 14, 2020 issued by the Korean Intellectual Property Office in counterpart Korean Application No. 10-2016-0013523.
Communication dated May 19, 2020 issued by the United States Patent Office in counterpart U.S. Appl. No. 15/775,194.
International Search Report, issued by International Searching Authority in corresponding International Application No. PCT/KR2016/012854, dated Feb. 8, 2017, (PCT/ISA/210).
Written Opinion, issued by International Searching Authority in corresponding International Application No. PCT/KR2016/012854, dated Feb. 8, 2017, (PCT/ISA/237).
Communication dated Feb. 4, 2019 issued by the European Patent Office in counterpart European Application No. 16 866 604.8.
Communication dated Oct. 21, 2020, issued by the Indian Intellectual Property Office in Indian Patent Application No. 201817018999.
Communication dated Nov. 25, 2020, issued by the European Patent Office in European Application No. 16866604.8.
Written Opinion dated Feb. 23, 2017, issued by the International Searching Authority in International Application No. PCT/KR2016/013195 (PCT/ISA/237).
Office Action dated Jun. 17, 2019, issued by the USPTO in U.S. Appl. No. 15/775,194.
Communication dated Jul. 21, 2021, issued by the Korean Patent Office in counterpart Korean Patent Application No. 10-2016-0011446.
Communication dated Jul. 22, 2021, issued by the European Patent Office in counterpart European Application No. 16866604.8.
Communication dated Sep. 24, 2021, issued by the State Intellectual Property Office of P.R. China in counterpart Chinese Application No. 201680067215.2.
Communication dated Nov. 9, 2021 by the European Patent Office for European Patent Application No. 16866604.8.
Communication dated Dec. 20, 2021 by the China National Intellectual Property Administration for Chinese Patent Application No. 201680067215.2.
Communication dated Mar. 9, 2022, issued by the China National Intellectual Property Administration in counterpart Chinese Application No. 201680067215.2.

(a)      (b)

(c)

(a) (b)

(c)

(a)

(b)          (c)

(a)

(b)

(d)

(c)

(a)　　　　　　　　　(b)

(c)　　　　　　　　　(d)

ELECTRONIC DEVICE HAVING ROLLABLE DISPLAY AND METHOD OF CONTROLLING THE SAME

CROSS-REFERENCE TO RELATED APPLICATIONS

This application is a Continuation Application of U.S. application Ser. No. 15/276,991, filed on Sep. 27, 2016, which claims the benefit of U.S. Provisional Application No. 62/256,889, filed on Nov. 18, 2015, in the United States Patent and Trademark Office, and priority from Korean Patent Application No. 10-2016-0011446, filed on Jan. 29, 2016, in the Korean Intellectual Property Office, the disclosures of which are incorporated herein by reference in their entireties.

BACKGROUND

Field

Apparatuses and methods consistent with the exemplary embodiments relate to an electronic device and a method of controlling the electronic device, and more particularly, to an electronic device including a display that is rolled by a roll and includes a display area having a size that changes according to a rotation of the roll, and a method of controlling the electronic device.

Description of the Related Art

Display apparatuses are among the most important electronic products. In recent years, the size of electronic devices, including display apparatuses, has been reduced. However, many consumers demand large screens. Therefore, flexible displays that may be rolled into electronic devices or that have foldable screens have been actively researched and developed.

In particular, rollable displays that may be rolled into rolls have been actively researched, and electronic devices including rollable displays are expected to be commercialized soon.

SUMMARY

Exemplary embodiments overcome the above disadvantages and other disadvantages not described above. Also, exemplary embodiments are not required to overcome the disadvantages described above, and an exemplary embodiment may not overcome any of the problems described above.

Exemplary embodiments provide an electronic device that, if a size of a display area of a display is changed by a rolling interaction or an unrolling interaction, changes one of a size and a layout of an element included in a screen according to a changed size of the screen, and a method of controlling the electronic device.

According to an aspect of an exemplary embodiment, an electronic device includes a housing, a roll at least partially contained in the housing, a display configured to be rolled on the roll, the display including a display area having a size that changes according to a rotation of the roll, and the display being configured to display a screen including at least one element in the display area, a sensor configured to sense the size of the display area, and a processor electrically connected to the display and the sensor. The processor may be configured to change at least one of a size and a layout of the at least one element included in the screen according to the size of the display area in response to the size of the display area being changed according to the rotation of the roll.

The processor may be further configured to control the display to increase the size of the at least one element included in the screen in response to the size of the display area increasing by the rotation of the roll, and to change a layout of the screen from a first layout into a second layout in response to the size of the display area exceeding a preset first size.

The first layout may be a subcomponent of the second layout.

The processor may be further configured to control the display to maintain the layout of the screen in the second layout and to increase the size of the at least one element included in the screen in response to the size of the display area increasing by the rotation of the roll, and to change the layout of the screen from the second layout into a third layout in response to the size of the display area exceeding a preset second size.

The processor may be further configured to control the display to maintain the layout of the screen in the second layout and to decrease the size of the at least one element included in the screen in response to the size of the display area decreasing by the rotation of the roll, and to change the layout of the screen from the second layout into the first layout in response to the size of the display area becoming smaller than the preset first size.

The processor may be further configured to control the display to change the layout of the screen in response to the size of the display area exceeding the preset first size when an orientation of the electronic device is maintained in a horizontal direction, and to display an additional plurality of elements on the screen in response to the size of the display area exceeding the preset first size when the orientation of the electronic device is maintained in a vertical direction.

The processor may be further configured to control the display to change the layout of the screen in response to the size of the display area exceeding the preset first size when a first application is being executed by the electronic device, and to display an additional plurality of elements on the screen in response to the size of the display area exceeding the preset first size when a second application is being executed by the electronic device.

The processor may be further configured to control the display to change the layout of the screen by adding or deleting an element or by changing a display location of the at least one element based on a priority order of the at least one element included in the screen.

The processor may be further configured to control the display such that, in response to the size of the display area increasing or decreasing by the rotation of the roll, a display location of an element having a first priority order among elements included in the screen is not changed, a display location of an element having a second priority order among the elements included in the screen is changed according to a change in the size of the display area, and an element having a third priority order among the elements included in the screen is added or deleted according to the change in the size of the display area.

The processor may be further configured such that, in response to the element including a plurality of contents, the priority order of the element is determined according to types of the plurality of contents.

According to another aspect of an exemplary embodiment, a method of controlling an electronic device including a housing, a roll at least partially contained in the housing, and a display configured to be rolled on the roll, the display including display area having a size that changes according to a rotation of the roll, and the display being configured to display a screen including at least one element in the display area, includes sensing the change in the size of the display area according to the rotation of the roll, and changing at least one of a size and a layout of the at least one element included in the screen according to the changed size of the display area.

The changing may include increasing the size of the at least one element included in the screen in response to the size of the display area increasing by the rotation of the roll, and changing a layout of the screen from a first layout into a second layout in response to the size of the display area exceeding a preset first size.

The first layout may be a subcomponent of the second layout.

The changing may further include, in response to the size of the display area further increasing by the rotation of the roll, maintaining the layout of the screen in the second layout and further increasing the size of the at least one element included in the screen, and in response to the size of the display area exceeding a preset second size, changing the layout of the screen from the second layout into a third layout.

The changing may further include, in response to the size of the display area decreasing by the rotation of the roll, maintaining the layout of the screen in the second layout and decreasing the size of the at least one element included in the screen, and in response to the size of the display area becoming smaller than the preset first size, changing the layout of the screen from the second layout into the first layout.

The changing may further include, in responses to the size of the display area exceeding the preset first size when an orientation of the electronic device is being maintained in a horizontal direction, changing the layout of the screen, and in response to the size of the display area exceeding the preset first size when the orientation of the electronic device is being maintained in a vertical direction, displaying an additional plurality of elements on the screen.

The changing may further include, in response to the size of the display area exceeding the preset first size in response to a first application being executed in the electronic device, changing the layout of the screen, and in response to the size of the display area exceeding the preset first size in response to a second application being executed in the electronic device, displaying a plurality of additional elements on the display.

The changing may further include, in response to the changing the layout of the screen, adding or deleting an element included in the screen or changing a display location of the at least one element based on a priority order of the at least one element.

The changing may further include not changing a display location of an element having a first priority order among elements included in the screen, changing a display location of an element having a second priority order among the elements included in the screen according to the change in the size of the display area, and adding or deleting an element having a third priority order among the elements included in the screen according to the change in the size of the display area.

In response to the at least one element including a plurality of contents, the priority order of the at least one element is determined according to types of the plurality of contents.

Additional and/or other aspects and advantages of the exemplary embodiments will be set forth in part in the description which follows and, in part, will be obvious from the description, or may be learned by practice of the exemplary embodiments.

BRIEF DESCRIPTION OF THE DRAWING FIGURES

The above and/or other aspects of the exemplary embodiments will be more apparent by describing certain exemplary embodiments with reference to the accompanying drawings, in which.

Figure 14:
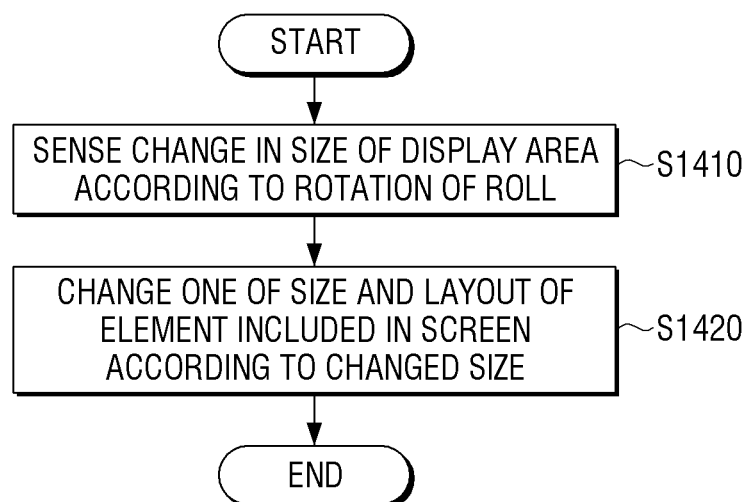
Figure 15:
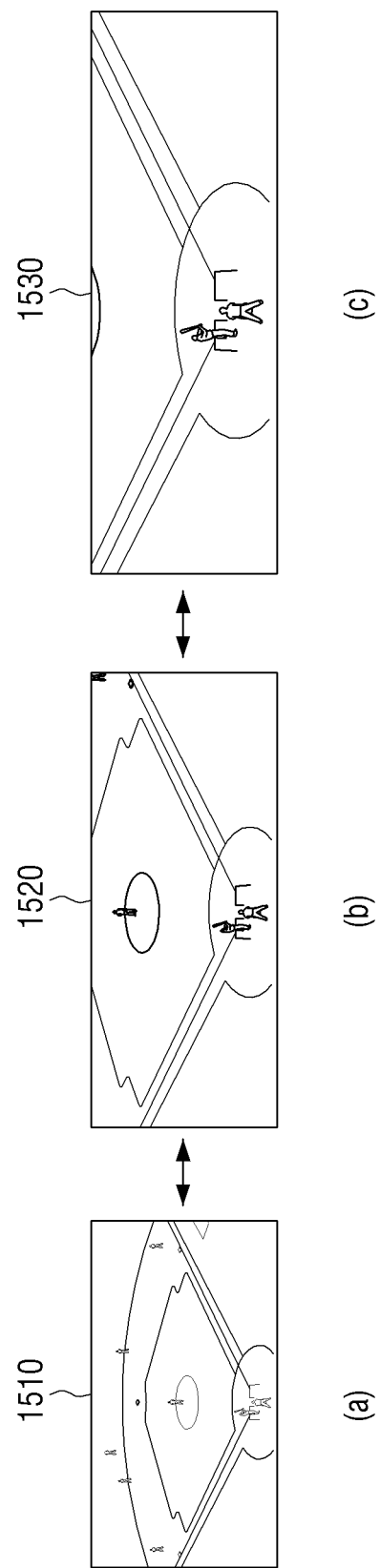

FIGS. 5, 6, 7, 8, 9, 10, 11, 12, and 13 illustrate the providing of an execution screen of an application according to a size of a display area of an electronic device, according to various aspects of an exemplary embodiment;

FIG. 14 is a flowchart of a method of controlling an electronic device, according to an aspect of an exemplary embodiment; and FIG. 15 illustrates a method of controlling an electronic device, according to another aspect of an exemplary embodiment.

DETAILED DESCRIPTION OF THE EXEMPLARY EMBODIMENTS

Certain aspects of exemplary embodiments will now be described in greater detail with reference to the accompanying drawings.

In the following description, same drawing reference numerals are used for the same elements even in different drawings. The matters defined in the description, such as detailed construction and elements, are provided to assist in a comprehensive understanding of the exemplary embodiments. Thus, it is apparent that the exemplary embodiments can be carried out without those specifically defined matters. Also, well-known functions or constructions are not described in detail since they would obscure the description with unnecessary detail.

Hereinafter, while exemplary embodiments are capable of various modifications and alternative forms, embodiments thereof are shown by way of example in the drawings and will herein be described in detail. It may be understood, however, that there is no intent to limit exemplary embodiments to the particular forms disclosed, but on the contrary, exemplary embodiments are to cover all modifications, equivalents, and alternatives. Like numbers refer to like elements throughout the description of the figures.

The terms "include", "comprise", etc. used herein designate the presence of disclosed corresponding functions, operations, elements, etc. and do not limit additional one or more functions, operations, elements, etc. Also, the terms "include" or "comprise", "have", etc. designate the presence of features, numbers, steps, operations, components, elements, or a combination thereof that are written in the specification, but do not exclude the presence or possibility of addition of one or more other features, numbers, steps, operations, components, elements, or a combination thereof.

As used herein, the term "and/or" includes any and all combinations of one or more of the associated listed items. For example, the term "and/or" may include "A and/or B", "A", "B", or both of "A" and "B".

Expressions "first", "second", etc. used herein may modify various exemplary embodiments but do not restrict corresponding elements. For example, the expressions do not restrict orders and/or importances, etc. of corresponding elements. The expressions may be used to distinguish one element from another element. For example, a first user device and a second user device are all user devices and indicate different user devices. For example, a first element may be termed a second element, and, similarly, a second element may be termed a first element, without departing from the scope of example embodiments.

It will be understood that when an element is referred to as being coupled with/to or connected to another element, the element may be connected to the another element directly or indirectly through another element. In contrast, when an element is referred to as being "directly coupled with/to" or "directly connected to" another element, there are no intervening elements between the element and the another element. The terminology used herein is for the purpose of describing particular embodiments only and is not intended to be limiting of the exemplary embodiments. As used herein, the singular forms are intended to include the plural forms as well, unless the context clearly indicates otherwise Also, in the present disclosure, a user interaction may include at least one selected from a touch interaction, a rolling interaction, an unrolling interaction, a bending interaction, a voice interaction, a button interaction, a motion interaction, and a multimodal interaction, but is not limited thereto.

In particular, the "rolling interaction" used herein may be an interaction of rolling a flexible display to decrease a display area of the flexible display, i.e., an interaction of inserting the flexible display into a housing of an electronic device by a rotation of a roll. Also, the "unrolling interaction" used herein may be an interaction of unrolling the flexible display to increase the display area of the flexible display, i.e., an interaction of taking the flexible display out of the housing of the electronic device by a rotation of the roll.

Also, the "application" used herein refers to a series of computer program sets designed to perform a particular job. Here, the application may be one or more of various types of applications. For example, the application may be a game application, a moving image play application, a map application, a memo application, a schedule application, a phonebook application, a broadcast application, an exercise support application, a payment application, a photo folder application, a medical device control application, an application providing user interfaces of a plurality of medical devices, or the like but is not limited thereto.

In addition, the "layout" used herein may refer to a method of displaying the number of elements configuring a screen, locations of the elements, and display items of the elements. In other words, a change in the layout of the screen may mean that the number of elements configuring the screen is changed, the locations of the elements are changed, or a display method of the display items of the elements is changed (e.g., a moving image content is changed into an icon). Here, the locations of the elements may be relative locations between the elements.

Figure 1:
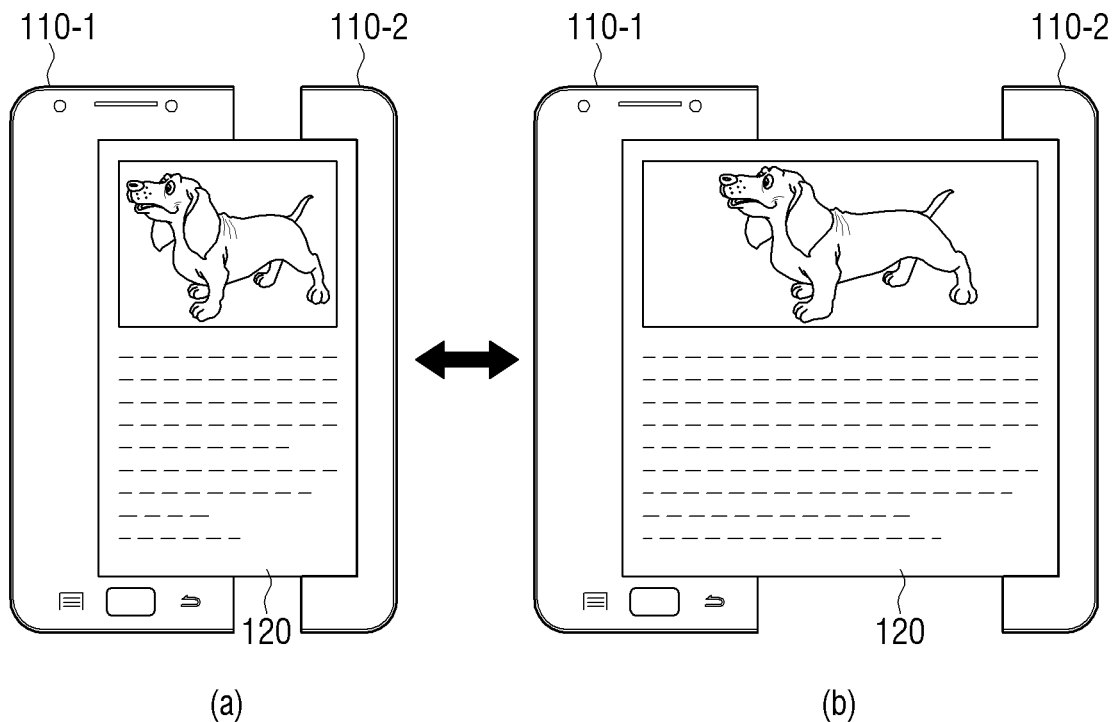
FIG. 1 illustrates the providing of an execution screen of an application according to a size of a display area of an electronic device, according to an aspect of an exemplary embodiment.
Figure 1:
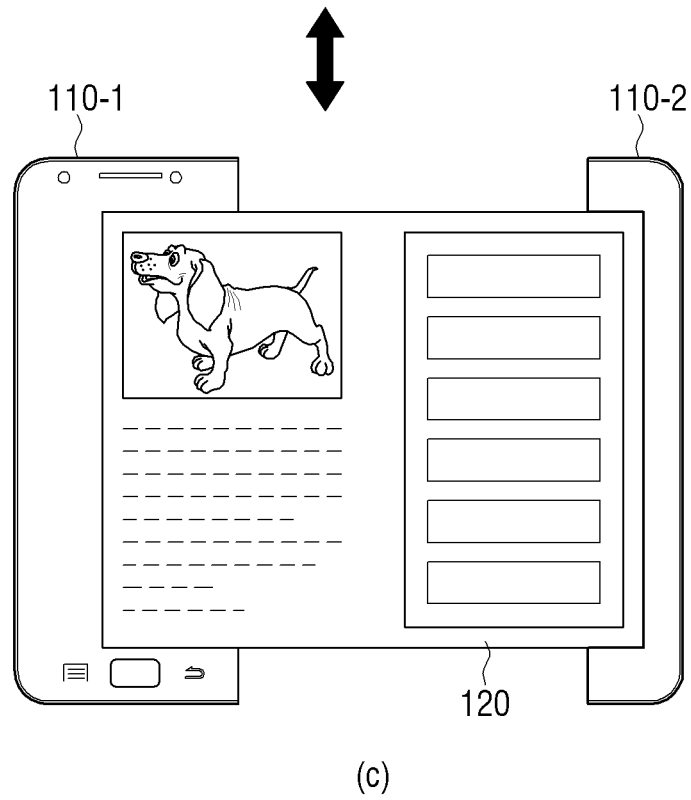

Hereinafter, various aspects of exemplary embodiments will be described with reference to the attached drawings. FIG. 1 illustrates the providing of an execution screen of an application according to a size of a display area of an electronic device 100, according to an aspect of an exemplary embodiment. The electronic device 100 according to the present exemplary embodiment may be a portable terminal such as a smartphone. However, this is merely an exemplary embodiment, and thus the electronic device 100 may be realized as various types of electronic devices such as a tablet personal computer (PC), a notebook PC, a desktop PC, a digital TV, etc.

Referring to FIG. 1, the electronic device 100 may display a screen including at least one element. Here, the screen may be one of various types of screens such as an application execution screen, a menu screen, an unlock screen, etc. Also, the at least one element may include various types of elements such as a content, an icon, a text, a widget, a graphic item (e.g., a progress bar or the like), etc. For example, the electronic device 100 may display a menu screen including a plurality of widgets and a plurality of icons, an execution screen of an application including a plurality of image contents, and an unlock screen including current time information and a graphic item for unlocking.

Figure 2A:
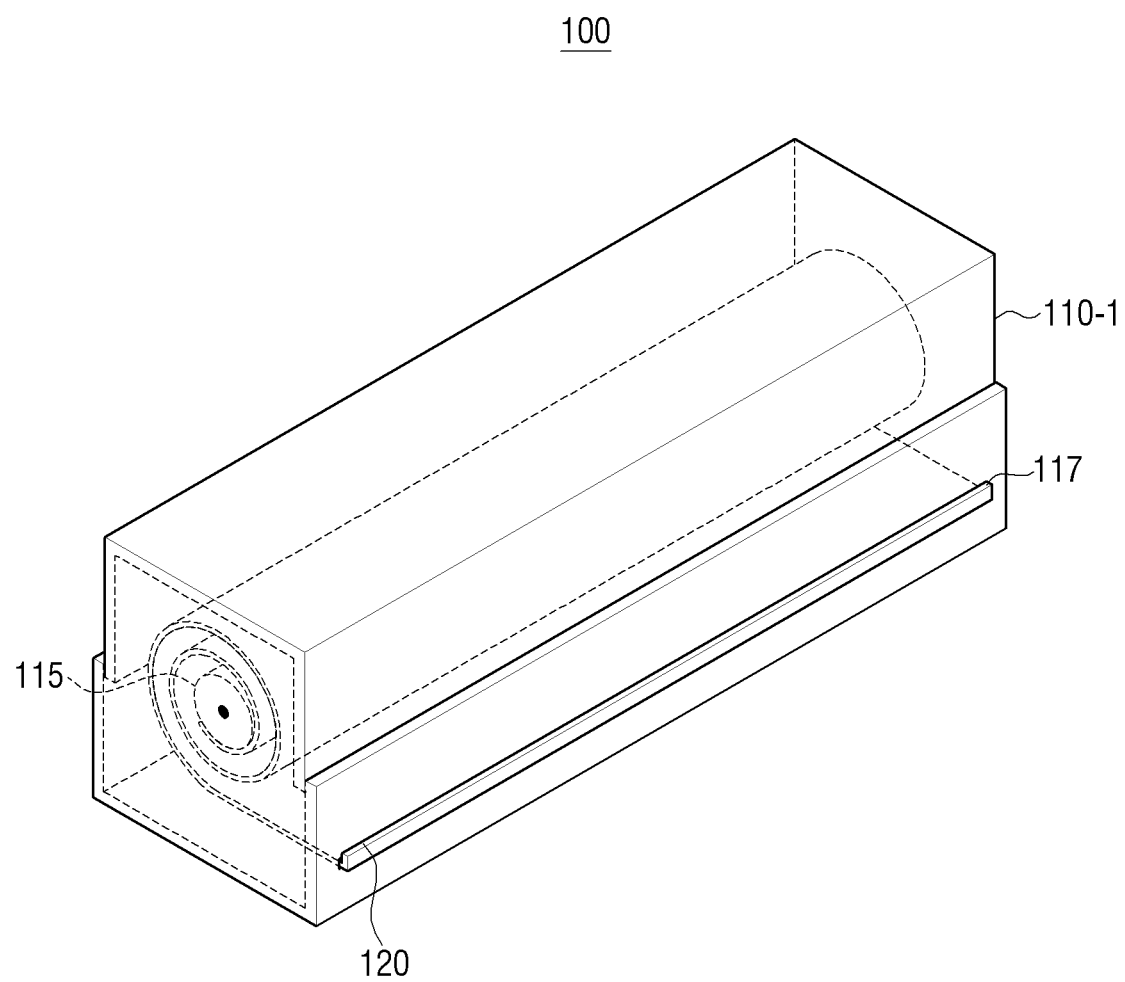
FIGS. 2A and 2B illustrate an electronic device including a rollable display, according to an aspect of an exemplary embodiment.
Figure 2B:
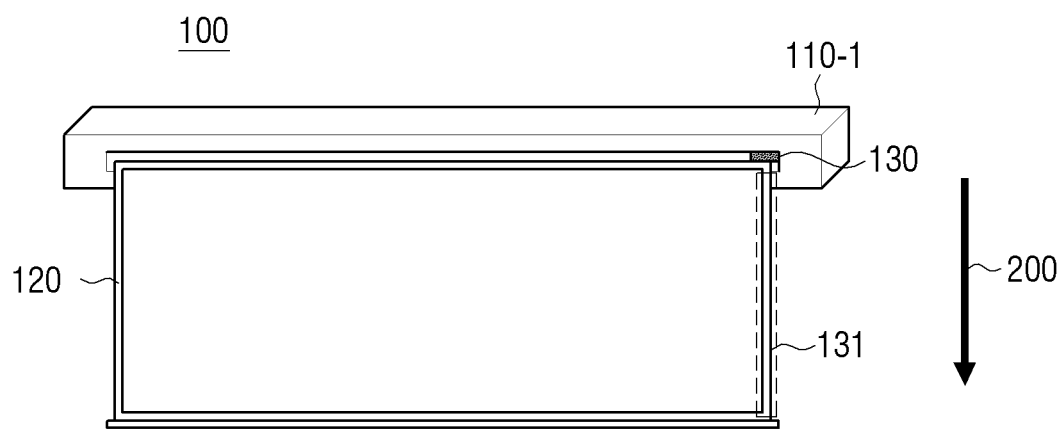

As shown in drawings (a), (b), and (c) of FIG. 1, the electronic device 100 according to the present exemplary embodiment includes a left housing 110-1, a right housing 110-2, and a rollable display 120. In particular, as shown in FIGS. 2A and 2B, the left housing 110-1 may include a roll 115 on which the rollable display 120 may be rolled and an opening 117 through which the rollable display 120 may be inserted into and/or taken out of the electronic device 100. According to various exemplary embodiments, the roll 115 may take the form of a dowel, pin, rod, shaft, spindle, axle, or the like. Also, the right housing 110-2 may be combined with the rollable display 120 to form a single body.

Also, the rollable display 120 may be inserted into and/or taken out of the electronic device 100 through the opening 117 according to a rotation of the roll 115. If the rollable display 120 is inserted into the electronic device 100 through the opening 117, the size of a display area of the rollable display 120 may decrease. If the rollable display 120 is taken out of the electronic device 100 through the opening 117, the size of the display area of the rollable display 120 may increase. Here, the rotation of the roll 115 may be performed by a user interaction of gripping the right housing 110-2 to pull or push the right housing 110-2, but this is merely an exemplary embodiment. Therefore, the rotation of the roll 115 may be automatically performed by a driver that drives the roll 115.

In the above-described exemplary embodiment, the rotation of the roll 115 has been described as being performed through an interaction of gripping the right housing 110-2 only to pull or push the right housing 110-2. However, this is merely an exemplary embodiment, and thus the rotation of the roll 115 may be performed through an interaction of gripping at least one of the left and right housings 110-1 and 110-2 both having rolls to pull or push the at least one of the left and right housings 110-1 and 110-2.

Also, although not shown in FIGS. 2A and 2B, the electronic device 100 may include an element that may fix a rolling state and an unrolling state of the rollable display 120.

In particular, if an unrolling interaction is input by a user, the electronic device 100 may take the display 120 out of the housing of the electronic device 100 according to a rotation of the roll 115 that is performed by the unrolling interaction. Alternatively, if a rolling interaction is input by the user, the electronic device 100 may insert the display 120 into the housing of the electronic device 100 according to a rotation of the roll 115 that is performed by the rolling interaction.

If a size of a display area of the display 120 is changed according to a rotation of the roll 115 that is performed according to a rolling interaction or an unrolling interaction, the electronic device 100 may change one of a size and a layout of an element of a screen according to the size of the display area. In detail, if the size of the display area increases by the rotation of the roll that is performed according to the unrolling interaction, the electronic device 100 may increase a size of at least one element included in the screen when the size of the display area is a preset first size. Here, while sizes of elements increase, relative locations between the elements, the number of elements, and display forms of the elements may be kept the same. Also, the increases in the sizes of the elements may mean increases in display areas occupied by the elements and increases in various types of contents (e.g., a text, an image, a moving image, a hyperlink, etc.) included in the display areas occupied by the elements. In particular, if an element is a text, an increase in a size of the element may mean an increase in a size of the text and an increase in an amount of the text. Also, if the element is an image or a moving image, the increase in the size of the element may mean an increase in a size of the image or the moving image. If the element is a hyperlink, the increase in the size of the element may mean an increase in a display amount of the text indicating the hyperlink.

If the size of the display area exceeds the preset first size according to the rotation of the roll that is performed according to the unrolling interaction, the electronic device 100 may change a layout of the screen from a first layout into a second layout. Here, the change in the layout may mean a change in relative dispositions of elements, a change in the number of elements, or a change in display areas of the elements on the screen. For example, if first and second elements included in the layout are disposed to the left and right and then disposed up and down, this may mean a change in the layout. Also, if the elements included in the layout are removed or a new element is added, this may mean a change in the layout. If display forms of the elements included in the layout are changed (e.g., if a moving image is changed into an icon), this may mean a change in the layout. If the layout is changed, the electronic device 100 may selectively increase or decrease sizes of the elements.

For example, as shown in drawing (a) of FIG. 1, a size of a display area of a display 120 is a first size (e.g., 40% of a maximum size of the display), the electronic device 100 may display a screen on the display 120 including a plurality of elements in a first layout.

If an unrolling interaction of pulling a right housing 110-2 of the electronic device 100 to the left is input by a user, the electronic device 100 may increase a display area of a display according to a rotation of a roll. Here, as shown in drawing (b) of FIG. 1, the electronic device 100 may maintain the first layout and increase sizes of a plurality of elements included in a screen when the size of the display is a preset first size (e.g., 60% of a whole size). Here, the electronic device 100 may increase the sizes of the plurality of elements in proportion to the size of the display area.

Also, if the size of the display area exceeds the preset first size by an unrolling interaction of pulling a right housing of the electronic device 100 to the right, the electronic device 100 may change a layout of the screen from the first layout to a second layout as shown in drawing (c) of FIG. 1. Here, the second layout may be a layout including a new element besides an element included in the first layout.

Also, if the display area decreases by a rotation of the roll that is performed according to a rolling interaction, the electronic device 100 may decrease a size of at least one element included in the screen when the size of the display is a preset second size. Here, while the size of the element decreases, relative locations of elements, the number of elements, and display forms of the elements may be kept the same. In addition, the decrease in the size of the element may mean a decrease in a display area occupied by the element and a decrease in various types of contents (e.g., a text, an image, a moving image, a hyperlink, etc.) included in the display area occupied by the element. In particular, if the element is a text, the decrease in the size of the element may mean a decrease in a size of the text and a decrease in an amount of the text. If the element is an image or a moving image, the decrease in the size of the element may mean a decrease in a size of the image or the moving image or may mean that a part of the image or the moving image is cropped. If the element is a hyperlink, the decrease in the size of the element may mean a decrease in a display amount of the text indicating the hyperlink or a change of the hyperlink into a replacement hyperlink.

If the size of the display area decreases to be lower than the preset second size by a rotation of the roll that is performed according to a rolling interaction, the electronic device 100 may change the layout of the screen from the second layout into the first layout. Here, the change in the layout may mean a change in a relative disposition of elements included in the screen, a change in the number of elements, or a change in display forms of the elements.

Figure 3A:
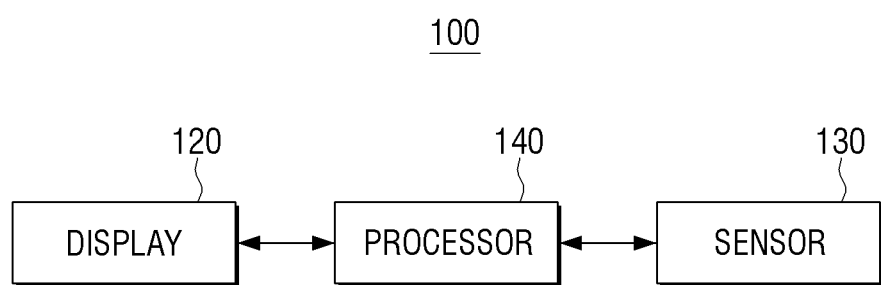
FIGS. 3A and 3B are block diagrams of a hardware configuration of an electronic device, according to an aspect of an exemplary embodiment.

FIG. 3A is a block diagram of a simple configuration of the electronic device 100, according to an aspect of an exemplary embodiment. As shown in FIG. 3A, the electronic device 100 includes a display 120, a sensor 130, and a processor 140.

The display 120 displays image data. In particular, the display 120 may be realized as a flexible display. The display 120 may also be inserted into or taken out of a housing 110 of the electronic device 100 according to a rotation of a roll included in the housing 110 of the electronic device 100.

If the display 120 is inserted into or taken out of the housing 110 according to the rotation of the roll, a display area of the display 120 may be changed according to the rotation of the roll. In detail, if the display 120 is inserted into the housing 110 according to a rotation of the roll, the display area of the display 120 may decrease. If the display 120 is taken out of the housing 110 according to a rotation of the roll, the display area of the display 120 may increase.

Also, the display 120 may display a screen including at least one element under control of the processor 140. For example, the display 120 may display an execution screen of an application (e.g., a web application, a camera application, a gallery application, a message application, or the like) including a plurality of contents and an icon. The display 120 may also display an idle screen including a plurality of widgets and a plurality of icons. Also, the display 120 may display an unlock screen including a plurality of widgets and an unlock icon.

The sensor 130 may include various types of sensors and transmit information collected respectively from the sensors to the processor 140. In particular, the sensor 130 may include a sensor that senses an amount of the display 120 that is acquired according to a rotation of the roll 115. In detail, referring to FIG. 2B, the left housing 110-1, the display 120, and the sensor 130 are illustrated. The display 120 may be rolled into the left housing 110-1 or may be taken out of the left housing 110-1. A taken direction of the display 120 may be a lower direction 200. The sensor 130 may be a light sensor and may sense a pattern 131 printed on the display 120. The pattern 131 may be a Quick Response (QR) code, a bar code, a black and white pattern, or a color pattern corresponding to a pixel line of the display 120. As the display 120 is taken out of the left housing 110-1, a value of the pattern 131 printed on the display 120 may be changed, and the processor 140 may sense a taken amount of the display 120 according to the changed value of the pattern 131.

The above-described exemplary embodiment is merely an exemplary embodiment, and thus the taken amount of the display 120 may be determined according to various methods. For example, the taken amount of the display 120 may be determined through a motion sensor such as a gyro sensor or the like or through a rotation sensor that senses a rotation of the roll.

The processor 140 is electrically connected to the display 120 and the sensor 130 and controls an overall operation of the electronic device 100. In detail, if a size of a display area is changed according to a rotation of the roll sensed through the sensor 130, the processor 140 may control the display 120 to change one of a size and a layout of an element included in a screen according to a size of a display area.

In particular, the processor 140 may control the display 120 to maintain a layout to a preset threshold size and change a size of an element if the size of the display area is changed according to a rotation of the roll 115 and may change the layout if the size of the display area exceeds the preset threshold size.

In detail, if the display area increases by the rotation of the roll 115, the processor 140 may control the display 120 to increase a size of at least one element included in the screen when the size of the display is smaller than or equal to a preset first size. Also, if the size of the display area exceeds the preset first size by a rotation of the roll 115, the processor 140 may control the display 120 to change the layout of the screen from a first layout to a second layout. Here, the second layout may be a layout where the first layout further includes additional information, i.e., wherein the first layout is a subcomponent of the second layout.

For example, if the display area increases by a rotation of the roll 115 while a web application screen including a text and a photo content is displayed, the processor 140 may control the display 120 to increase the sizes of the text and the photo content included in the web application screen when the size of the display area is up to a preset first size (e.g., 65% of a maximum size). Also, if the size of the display area exceeds the preset first size by a rotation of the roll 115, the processor 140 may control the display 120 to change the layout by adding a moving image to the web application screen.

If the display area continuously increases by a rotation of the roll 115 after the layout of the screen is changed into the second layout, the processor 140 may maintain the layout of the screen in the second layout and increase a size of at least one element included in the screen when the size of the display area is up to a preset second size (e.g., 95% of the maximum size). Also, if the size of the display area exceeds the preset second size by a rotation of the roll 115, the processor 140 may control the display 120 to change the layout of the screen from the second layout into a third layout. Here, the third layout may further include additional information in comparison with the first layout and the second layout. For instance, the second layout may be a subcomponent of the third layout.

If the display area decreases by a rotation of the roll 115 after the layout of the screen is changed into the second layout, the processor 140 may control the display 120 to maintain the layout of the screen in the second layout and decrease a size of at least one element included in the screen when the size of the display area is the preset first size. Also, if the size of the display area becomes smaller than the preset first size, the processor 120 may control the display 120 to change the layout of the screen from the second layout into the first layout.

Also, the processor 140 may control the display 120 to change the layout or further display an existing element on the screen according to an increase in the display area based on an orientation of the electronic 100 sensed by the sensor 130. In detail, if the size of the display area exceeds the preset first size while the location of the electronic device 100 is kept in a horizontal direction, the processor 140 may control the display 120 to change the layout by adding a new element. Also, if the size of the display area exceeds the preset first size while the location of the electronic device 100 is kept in a vertical direction, the processor 140 may control the display 120 to further display an existing element in the increased display area. In other words, a layout displayed when the display area increases in the vertical direction may be different from a layout displayed when the display area increases in the horizontal direction.

Also, the processor 140 may control the display 120 to change the layout or further display an existing element on the screen according to an increase in the display area based on a type of application that is executed. In detail, if the size of the display area exceeds the preset first size when a first application (e.g., a web application or the like) is executed in the electronic device 100, the processor 140 may control the display 120 to change the layout. If the size of the display area exceeds the preset first size when a second application (e.g., an e-book application or the like) is executed in the electronic device 100, the processor 140 may control the display 120 to further display an existing element on the screen.

In particular, if the size of the display area exceeds a threshold size, and thus the layout of the screen is changed, the processor 140 may control the display 120 to change the layout by adding or deleting an element or by changing a location of an element based on a priority order of an element included in the screen. For example, the processor 140 may control the display 120 not to change a display location of an element having a first priority order among elements included in the screen, to change a display location of an element having a second priority order among the elements included in the screen according to a change in the size of the display area, and to add or delete an element having a third priority order among the elements included in the screen according to a change in the size of the display area. Here, if an element includes a plurality of contents, a priority order of the element may be determined according to types of the plurality of contents. For example, a content having a first priority order may be a text content, a content having a second priority order may be a photo content, and a content having a third priority order may be a moving image content.

Figure 3B:
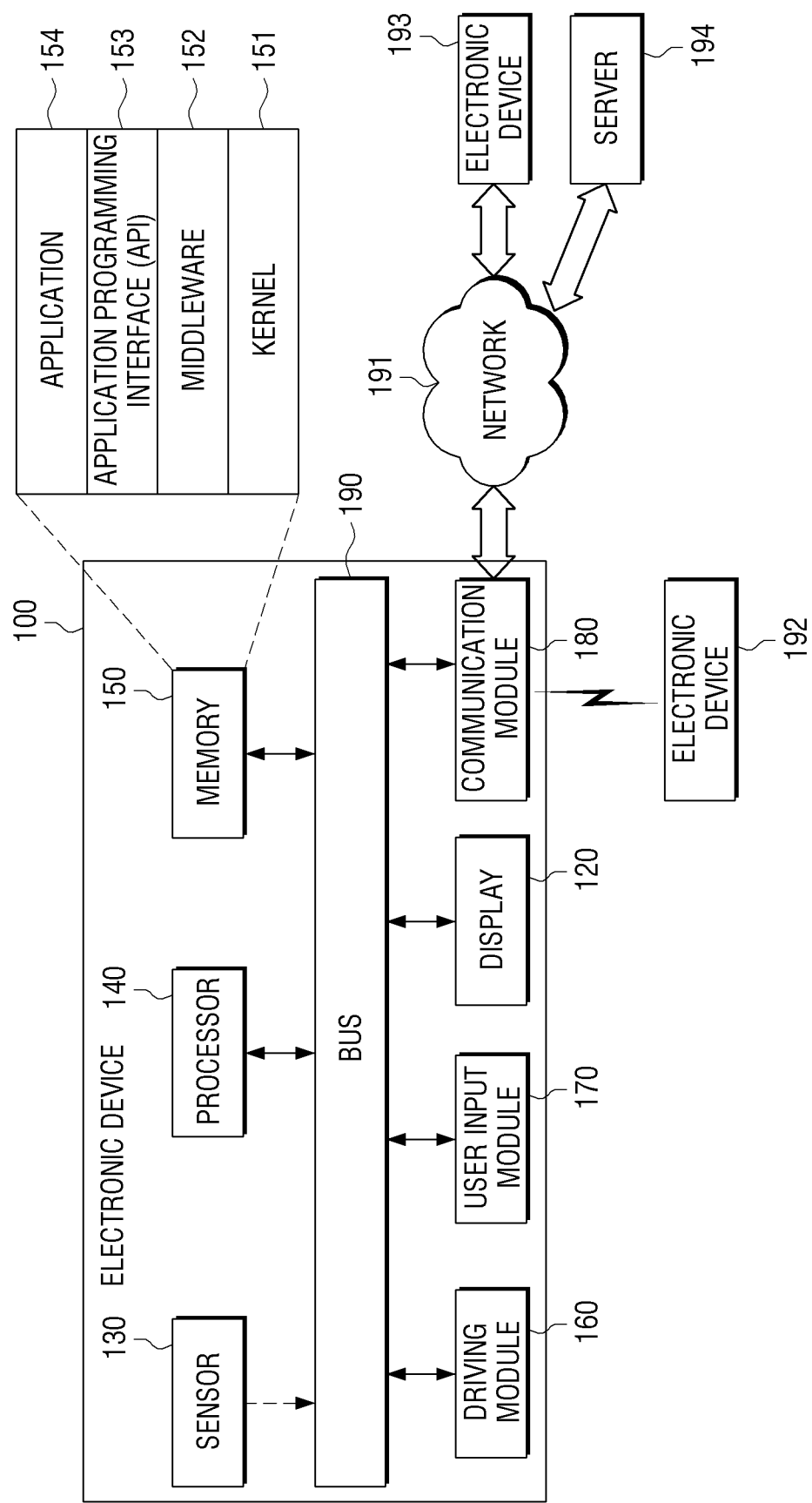

FIG. 3B is a block diagram of a detailed configuration of the electronic device 100, according to an aspect of an exemplary embodiment. As shown in FIG. 3B, the electronic device 100 includes a sensor 130, a processor 140, a memory 150, a driving module 160, a user input module 170, a display 120, a communication module 180, and a bus 190. Elements of FIG. 3B are merely an exemplary embodiment, and thus a new element may be added, and at least one element may be deleted according to exemplary embodiments.

For example, the processor 140 may receive instructions from other elements (e.g., the memory 150, the driving module 160, the user input module 170, the display 120, the communication module 160, etc.) through the bus 190, decipher the received instructions, and perform an operation or data processing according to the deciphered instructions.

The processor 140 may also control an overall operation of the electronic device 100. In particular, the processor 140 may change one of a size and a layout of an element according to a change in a display area sensed by the sensor 130. The processor 140 may be realized as at least one selected from a Graphic Processing Unit (GPU), a Central Processing Unit (CPU), and an application processor (AP) or as one chip.

The memory 150 may store instructions or data received from or generated by the processor 140 or other elements (e.g., the driving module 160, the user input module 170, the display 120, the communication 180, etc.). For example, the memory 150 may include programming modules such as a kernel 151, middleware 152, an application programming interface (API) 153, an application 154, etc. Each of the above-mentioned programming modules may include software, firmware, hardware, or a combination of at least two or more of them.

The memory 150 may be realized as various types of memories. For example, the memory 150 may be realized as an internal memory or an external memory. The driving module 160 is a module capable of driving a rotation of the roll 115 for rolling or unrolling a display. Here, the driving module 160 may automatically rotate the roll 115 according to a user instruction input through the user input module 170 or may semi-automatically rotate the roll 115 according to an external force (e.g., a pushing and pulling force) of a user input into a housing. The driving module 160 may also roll or unroll the display through another driving method not through a rotation of the roll 115.

Here, the driving module 160 may be realized as a motor or a circuit for controlling the motor, but this is merely an exemplary embodiment. Therefore, the driving module 160 may be realized as another element.

For example, the user input module 170 may receive an instruction or data from the user and transmit the instruction or data to the processor 140 or the memory 150 through the bus 190.

The user input module 170 may include various types of user input units such as a touch panel, a (digital) pen sensor, a key, an ultrasonic input unit, etc.

The display 120 may display a picture, an image, data, or the like to the user. In particular, the display 120 may be realized as a liquid crystal display (LCD), an active-matrix organic light-emitting diode (AM-OLED), or the like or may be realized to be flexible, transparent, or wearable.

The communication module 180 may transmit a communication between another electronic device 192 and the electronic device 100 and perform communications with another electronic device 193 and a sever 194 through a network 191. The communication module 180 may support a preset short-range communication protocol (e.g., wireless fidelity (WiFi), Bluetooth (BT), or near field communication (NFC)), a preset network communication (e.g., Internet, a local area network (LAN), a wire area network (WAN), a telecommunication network, a cellular network, a satellite network, or a plain old telephone service (POTS), or the like). The electronic devices 192 and 193 may be the same as (e.g., the same type of electronic devices as) or different from (e.g., different types of electronic devices from) the electronic device 100.

In particular, the communication module 180 may receive data about a web application by performing a communication connection to the server 194 through the network 191.

The sensor 130 may include various types of sensors such as a gyro sensor, a gesture sensor, a grip sensor, an acceleration sensor, etc. and provide the processor 140 with information collected respectively from the gyro sensor, the gesture sensor, the grip sensor, the acceleration sensor, etc. in preset time units.

In particular, the sensor 130 may include at least one selected from a gesture sensor, a gyro sensor, a pressure sensor, a magnetic sensor, an acceleration sensor, a grip sensor, a proximity sensor, a red, green, blue (RGB) sensor, a biometric sensor, a temperature/humidity sensor, an illumination sensor, and an ultraviolet (UV) sensor. The sensor 130 may measure a physical quantity or sense an operation status of the electronic device 100 and convert measured or sensed information into an electric signal. The sensor 130 may further include a control circuit for controlling at least one or more sensors belonging to the sensor 130. The sensor 130 may also include various types of sensors for sensing a rotation of the roll 115.

The bus 190 may be a circuit that connects the above-described elements to one another and transmits communication signals (e.g., control messages) between the above-described elements.

The term "part" or "module" used herein may refer to a unit including one of hardware, software, and firmware or a combination of two or more of them. The "part" or "module" may be interchanged with the term such as a logic, a logical block, a component, a circuit, or the like. The "part" or "module" may be a minimum unit of components that are integrated into one body or a part of the minimum unit. The "module" may be a minimum unit that performs one or more functions or a part of the minimum unit. The "module" may be mechanically or electronically realized. For example, the "module" used herein may include at least one selected from an application-specific integrated circuit (ASIC) chip, a field-programmable gate arrays (FPGAs), and a programmable-logic device that are known or will be developed and perform operations.

Figure 4:
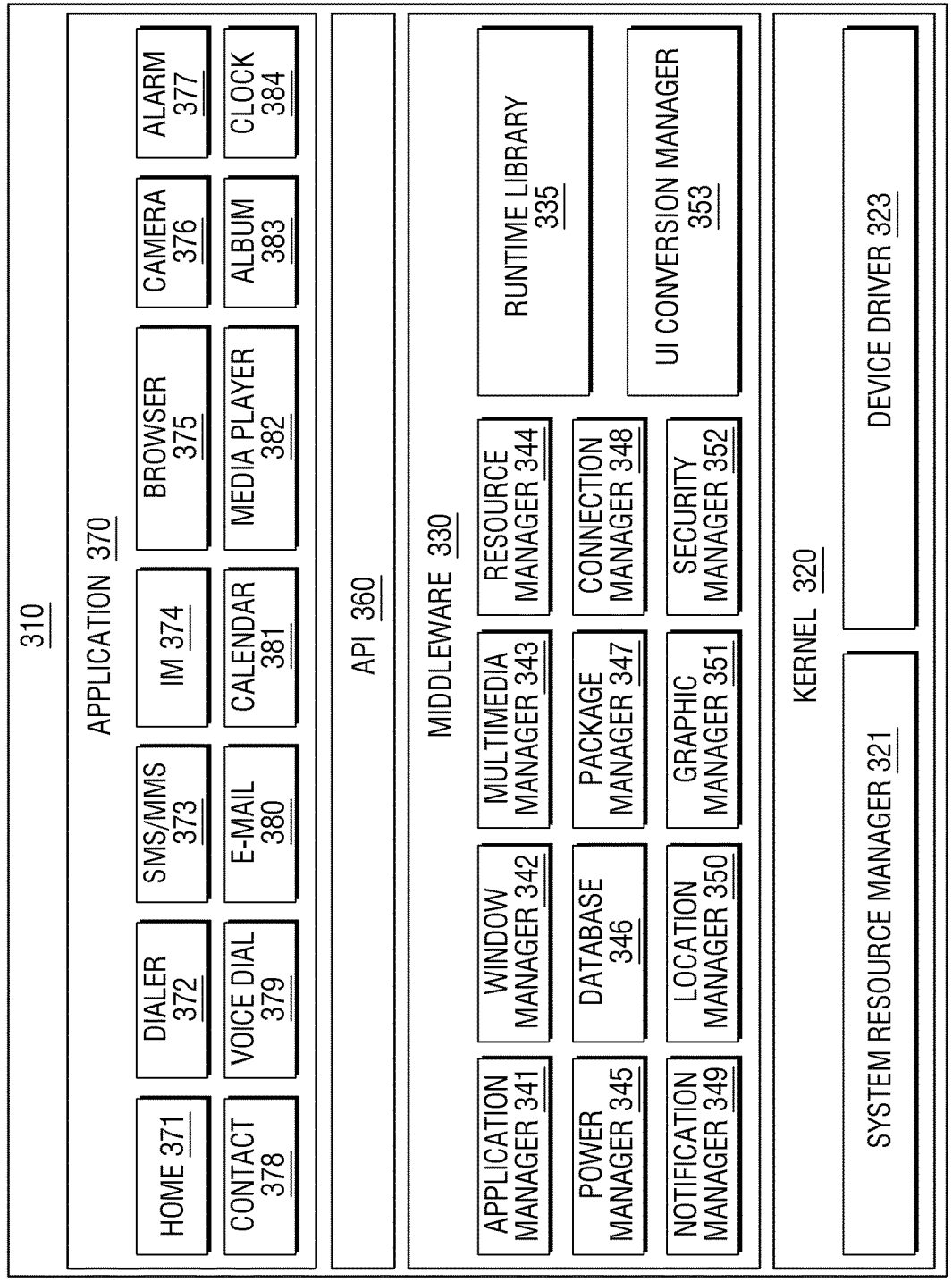
FIG. 4 illustrates a configuration of a programming module of an electronic device, according to an aspect of an exemplary embodiment.

FIG. 4 is a block diagram of a configuration of a programming module 310 of an electronic device, according to an aspect of an exemplary embodiment.

The programming module 310 may be included (e.g., stored) in the electronic device 100 (in particular, in the memory 15). At least a part of the programming module 300 may include software, firmware, hardware, or a combination of at least two or more of them. The programming module 310 may be realized in hardware of the electronic device 100 to include various types of applications (e.g., an application 370) that are driven on the electronic device 100 (e.g., an operating system (OS) controlling resources associated with the electronic device 100) or on the OS. For example, the OS may be Android, iOS, Windows, Symbian, Tizen, Bada, or the like. Referring to FIG. 4, the programming module 310 may include a kernel 320, middleware 330, an API 360, and the application 370.

The kernel 320 may include a system resource manager 321 and a device driver 323. The system resource manager 321 may control, allocate, or collect system resources. The device driver 323 may, for example, include a display driver, a camera driver, a BT driver, a shared memory driver, a universal serial bus (USB) driver, a keypad driver, a WiFi driver, or an audio driver.

The middleware 330 may include a plurality of modules that are realized in advance to provide functions commonly required by the application 370. Also, the middleware 330 may provide a function through the API 360 so as to enable the application 370 to efficiently use limited system resources of the electronic device 100.

A runtime library 335 may, for example, include a library module that is used by a compiler to add a new function through a programming language while the application 370 is executed.

An application manager 341 may, for example, manage a life cycle of at least one application of the application 370. A window manager 342 may manage GUI resources used on a screen. A multimedia manager 343 may check a format required for playing various types of media files and encode or decode the media files by using a codec appropriate for the corresponding format. A resource manager 344 may manage resources of a source code, a memory, a storage space, or the like of at least one application of the application 370. Here, the resource manager 344 may manage sizes and layouts of elements configuring the screen. A power manager 345 may operate along with a basic input/output system (BIOS) or the like to manage a battery or a power source and provide power information, etc. necessary for an operation. A database (DB) manager 346 may manage a DB, which will be used in at least one application of the application 370, so as to generate, search, or change the DB. A package manager 347 may manage installing or updating of an application that is distributed in a package file format. A connection manager 348 may manage a wireless connection such as WiFi, BT, or the like. A notification manager 349 may display or notify an event, such as an arrived message, an appointment, a proximity notification, or the like, to the user in a way of not disturbing the user. A location manager 350 may manage location information of the electronic device 100. A graphic manager 351 may manage a graphic effect that will be provided to the user or a user interface associated with the graphic effect. A security manager 352 may provide all security functions necessary for a system security, a user authentication, or the like. According to an exemplary embodiment, if an electronic device (e.g., the electronic device 100) includes a phone call function, the middleware 330 may further include a telephone manager (not shown) that manages a voice or video call function of the electronic device. Also, a user interface (UI) conversion manager 353 converts a UI according to a particular event. In particular, the UI conversion manager 353 may change a layout of the UI according to a change in a size of a display. Here, the UI conversion manager 353 may change the layout in an application that is executed, change the layout by converting the application (e.g., a mobile application), which is executed, into another application (e.g., a tablet application), and change the layout by changing an OS. If the electronic device 100 executes a web application through the sever 194, the UI conversion manager 353 may operate along with the server 194 to change a layout of the web application.

The middleware 330 may dynamically delete existing elements or add new elements. Therefore, some of elements described herein may be omitted, other elements may further included, or the elements may be replaced with elements having different names and performing similar functions.

The API 360 (e.g., the API 153) may be provided as a set of API programming functions, i.e., as different elements according to OSs. For example, if Android or iOS is used, one API set may be provided according to each platform. If Tizen is used, two or more API sets may be provided.

The application 370 may, for example, include a preloaded application or a third party application. The application 370 may include one or more application modules including a home module 371 for providing a home screen or home function, a dialer module 372 for providing voice telephone calls, an SMS/MMS module 373 for provided SMS/MMS messaging capability, an IM module 374 for providing instant or direct messaging, a browser module 375 for providing internet browsing capability, a camera module 376 for providing picture photography capabilities, an alarm module 377 for providing an alarm clock or other alarm functions, a contact module 378 for providing a contact list or database of contacts, a voice dial module 379 for providing the ability to utilize the telephone functionality of the dialer module 372 using voice commands or the like, an email module 380 for providing email functionality, a calendar module 381 for providing a user-friendly calendar listing appointments and events corresponding to particular dates, a media player module 382 for playback of various file types, an album module 383 for storing and organizing photograph pictures and the like, and a clock module 384 for keeping track of and displaying the current time.

At least a part of the programming module 310 may be realized as an instruction that is stored on a computer-readable storage medium. If the instruction is executed by one or more processors (e.g., the processor 140), the one or more processors may perform a function corresponding to the instruction. The computer-readable storage medium may, for example, be the memory 150. At least a part of the programming module 310 may, for example, be implemented (e.g., executed) by the processor 140. At least the part of the programming module 310 may include modules, programs, routines, sets of instructions, and/or processes for performing at least one function.

Names of elements of the programming module 310 according to the present exemplary embodiment may vary according to types of OSs. The programming module 310 according to the present exemplary embodiment may include at least one or more of the above-described elements, omit some of the above-described elements, or further include additional other elements. A programming module according to an aspect of an exemplary embodiment or operations performed by different elements may be processed according to a sequential, parallel, repetitive, and/or heuristic method. Also, some of the operations may be omitted or other operations may be added.

Figure 5:
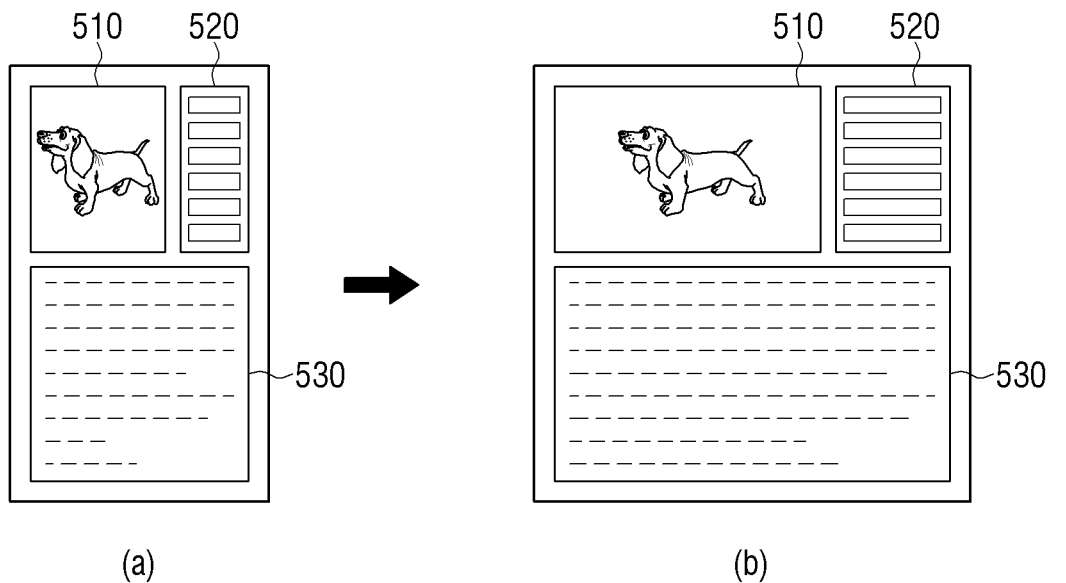
Figure 5:
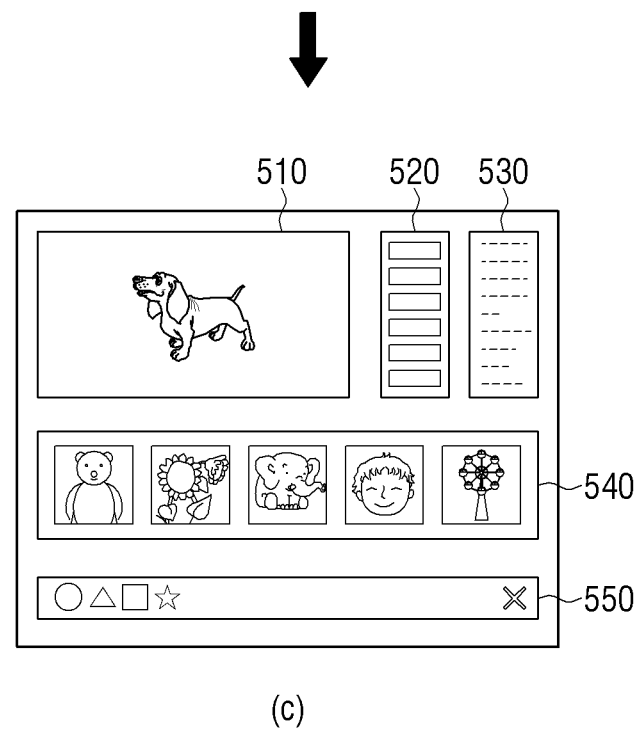

Hereinafter, aspects of an exemplary embodiment will be described in more detail with reference to FIGS. 5, 6, 7, 8, 9, 10, 11, 12, and 13. FIG. 5 illustrates a method of providing a screen by using the electronic device 100 if a display area increases according to a rotation of the roll 115, according to an aspect of an exemplary embodiment.

Referring to drawing (a) of FIG. 5, the processor 140 may control the display 120 to display a screen including a plurality of elements 510, 520, and 530. For example, the processor 140 may control the display 120 to display an execution screen of a web application including a photo content 510, a hyperlink list 520, and a text 530 as shown in drawing (a) of FIG. 5. Here, the execution screen of the web application may be a screen received from the server 194 through the network 191.

In particular, the screen shown in drawing (a) of FIG. 5 may have an area of 40% of a whole screen size. Here, the processor 140 may control the display 120 to display the photo content 510 on an upper left side of the screen, the hyperlink list 520 on an upper right side of the screen, and the text 530 on a lower part of the screen. In particular, a layout where the photo content 510 is displayed on the upper left side of the screen, the hyperlink list 520 is displayed on the upper right side of the screen, and the text 530 is displayed on the lower part of the screen may be a first layout of the web application.

Also, if a display area increases by a rotation of the roll 115 that is performed according to an unrolling interaction of a user, the processor 140 may control the display 120 to maintain the first layout and increase sizes of the plurality of elements 510, 520, and 530 as shown in drawing (b) of FIG. 5.

Here, the processor 140 may control the display 120 to increase the sizes of the plurality of elements 510, 520, and 530 in proportion to the display area that increases according to the rotation of the roll 115. For example, if a size of the display area increases from 40% of a maximum size screen to 50% of the maximum size screen, the processor 140 may control the display 120 to increase the sizes of the elements 510, 520, and 530 by a factor of 1.2.

The processor 140 may also control the display 120 to display the screen in a whole area of the display area without maintaining a picture ratio. In other words, if a vertical length of the display area is kept, and a horizontal length of the display area increases, the processor 140 may change the picture ratio into a ratio of the increased horizontal length and increase the sizes of the elements 510, 520, and 530.

Also, the processor 140 may control the display 120 to increase the sizes of some elements without increasing the sizes of all of elements displayed in the display area. For example, when the display area increases, the processor 140 may control the display 120 to maintain the sizes of the menus displayed on a side of the screen and to increase the sizes of the contents displayed in a center of the screen.

If the size of the display area increases and then exceeds a preset first size (e.g., 60% of the maximum screen size) by a rotation of the roll 115 that is performed according to an unrolling interaction of the user, the processor 140 may control the display 120 to change and display the layout of the web application as shown in drawing (c) of FIG. 5. In detail, as shown in drawing (c) of FIG. 5, the processor 140 may control the display 120 to display the photo content 510 on the upper left side of the screen, display the hyperlink list 520 on an upper center of the screen, and move and display the text 530 displayed on the lower part of the screen to an upper right side of the screen. The processor 140 may also control the display 120 to display a content list 540 as a new element in a middle part of the screen and to display a system control box 550 as a new element on a lower part of the screen.

In other words, the processor 140 may change the layout by changing a location of an existing element or by adding a new element. Here, a priority order of the existing element may determine a location of the existing element and whether the existing element is changed. For example, if the existing element has a high priority order, a size and a location of the existing element may not be changed. If the existing element has a lower priority order, at least one of the size and the location of the existing element may be changed.

In the above-described exemplary embodiment, a change in a layout has been described as a change in a location of an existing element or an addition of a new element. However, this is merely an exemplary embodiment, and the existing element may be deleted to change the layout. Here, if the existing element is deleted, a new element including contents of the existing element may be added.

If the display area continuously increases by a rotation of the roll 115 after the layout of the screen is changed into a second layout, the processor 140 may control the display 120 to maintain the layout of the screen in the second layout and to increase the sizes of at least one of elements 510, 520, 530, 540, and 550 included in the screen when the size of the display area is a preset second size.

Here, the processor 140 may control the display 120 to increase the sizes of the plurality of elements 510, 520, 530, 540, and 550 in proportion to the display area that increases according to a rotation of the roll 115. For example, if the size of the display area increases from 60% of the maximum size screen to 90% of the maximum size screen, the processor 140 may control the display 120 to increase the sizes of the elements 510, 520, 530, 540, and 550 by a factor of 1.5. The processor 140 may also control the display 120 to display the screen in a whole area of the display area without maintaining the picture ratio.

If the size of the display area exceeds a preset size (e.g., 95% of a whole screen size) by a rotation of the roll 115, the processor 140 may control the display 120 to change the layout of the screen from the second layout into a third layout. Here, the third layout may be a layout to which a new element is added, differently from the second layout.

Figure 6:
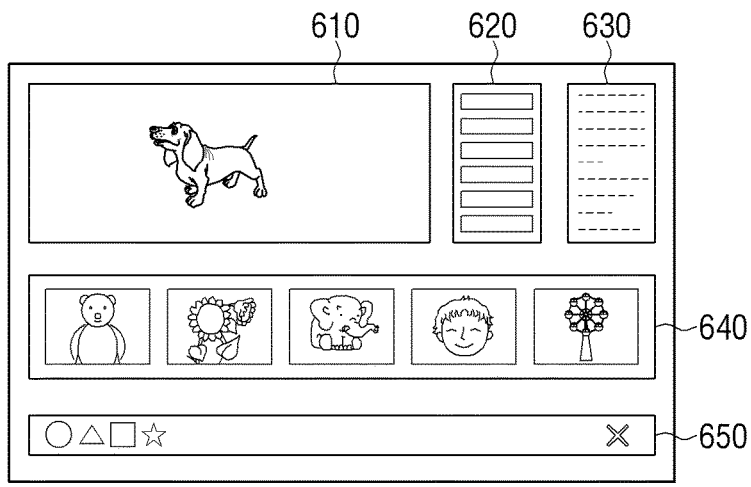
Figure 6:
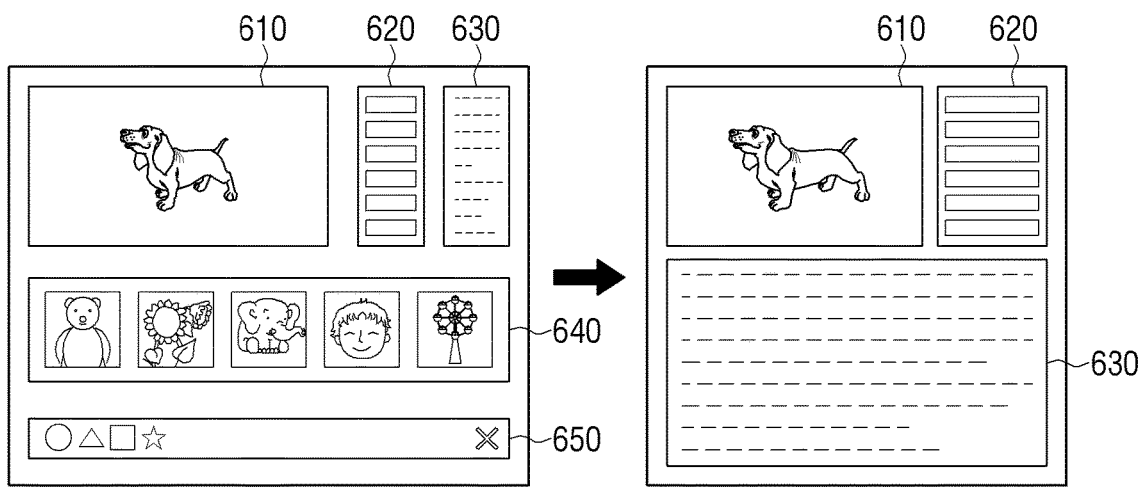

FIG. 6 illustrates a method of providing a screen by using the electronic device 100 if a display area decreases according to a rotation of the roll 115, according to an aspect of an exemplary embodiment.

Referring to drawing (a) of FIG. 6, the processor 140 may control the display 120 to display a screen including a plurality of elements 610, 620, 630, 640, and 650. For example, as shown in drawing (a) of FIG. 6, the processor 140 may control the display 120 to display an execution screen of a web application including a photo content 610, a hyperlink list 620, a text 630, a content list 640, and a system control box 650. In particular, the screen shown in drawing (a) of FIG. 6 may have an area of 80% of a whole screen size. Here, the processor 140 may control the display 120 to display the photo content 610 on an upper left side, the hyperlink list 620 on an upper center, the text 630 on an upper right side, the content list 640 in a middle part, and the system control box 550 on a lower part. In particular, a layout of the web application shown in drawing (a) of FIG. 6 may be a second layout of the web application.

Also, if the display area decreases by a rotation of the roll 115 that is performed according to a rolling interaction of a user, the processor 140 may control the display 120 to maintain the second layout and decrease the sizes of the plurality of elements 610, 620, 630, 640, and 650 as shown in drawing (b) of FIG. 6.

Here, the processor 140 may control the display 120 to decrease the sizes of the plurality of elements 610, 620, 630, 640, and 650 in proportion to the display area that decreases according to the rotation of the roll 115. For example, if the size of the display area decreases from 80% of the maximum size screen to 60% of the maximum size screen, the processor 140 may control the display 120 to decrease the sizes of the elements 610, 620, 630, 640, and 650 by 25%.

The processor 140 may also control the display 120 to display the screen in a whole area of the display area without maintaining a picture ratio. In other words, a vertical length of the display area is kept, and a horizontal length of the display area decreases, the processor 140 may change the picture ratio into a ratio of the decreased horizontal length and decrease the sizes of the elements 610, 620, 630, 640, and 650.

The processor 140 may also control the display 120 to decrease the sizes of some elements without decreasing all of elements displayed in the display area. For example, when the display area decreases, the processor 140 may control the display 120 to maintain sizes of contents displayed in a center of the screen and decrease sizes of menus displayed on a side of the screen.

If the size of the display area decreases to be lower than a preset first size (e.g., 65% of the maximum screen size) by a rotation of the roll 115 that is performed according to a rolling interaction of the user, the processor 140 may control the display 120 to change a layout. In detail, as shown in drawing (c) of FIG. 6, the processor 140 may control the display 120 to display the photo content 610 on the upper left side of the screen, display the hyperlink list 620 on the upper right side of the screen, and move the text 630 displayed on the upper right side of the screen to the lower part of the screen. The processor 140 may also control the display 120 to remove the content list 640 and the system control box 650 from the screen.

In other words, the processor 140 may change the layout by changing a location of an existing element or deleting the existing element. Here, a priority order of the existing element may determine a location of the existing element and whether the existing element is changed.

In the above-described exemplary embodiment, a change in a layout has been described as a change in a location of an existing element or a deletion of the existing element. However, this is merely an exemplary embodiment, and the layout may be changed by adding a new element. Here, the added new element may include some of contents of the existing element.

Referring to FIGS. 5 and 6 throughout, the electronic device 100 may display a screen in a first layout when a size of a display area is a preset first size (e.g., 60% of a maximum screen size), display the screen in a second layout when the size of the display area is between the preset first size and a preset second size (e.g., 95% of the maximum screen size), and display the screen in a third layout if the size of the display area exceeds the preset second size.

Here, if the electronic device 100 displays the screen in the first layout, the electronic device 100 may operate in a first mode (e.g., a phone mode). Also, if the electronic device 100 displays the screen in the second layout, the electronic device 100 may operate in a second mode (e.g., a note mode). If the electronic device 100 displays the screen in the third layout, the electronic device 100 may operate in a third mode (e.g., a tablet mode).

In the first through third modes, although a display area increases or decreases according to a rolling interaction or an unrolling interaction, sizes of elements included in the display area may be changed without changing a layout.

In the above-described exemplary embodiment, an electronic device has been described as operating in three types of modes. However, this is merely an exemplary embodiment, and the electronic device may operate in a plurality of modes besides the three types of modes. For example, the electronic device 100 may operate in first through third modes and in a fourth mode (e.g., in a TV mode).

Also, the processor 140 may control the driving module 160 to fix the size of the display area to one of the preset first size and the preset second size. In detail, if the user releases a right housing while an unrolling interaction of enabling the size of the display area to exceed the preset first size and increase to 80% of a whole screen size is input, the processor 140 may control the driving module 160 so as to enable the size of the display area to return to the preset first size without fixing the size of the display area to a size of the display area at a moment when the user releases the right housing. In other words, the processor 140 may adjust the size of the display area so as to maintain an optimum picture ratio in each mode.

In the above-described exemplary embodiment, if the display area increases to a size that is less than a preset size, the processor 140 has been described as increasing a size of an element while maintaining a layout, i.e., without changing layout from a first layout to a second layout. However, this is merely an exemplary embodiment, and the processor 140 may control the display 120 to further display an existing element while maintaining the layout and a size of an element. For example, if the display area increases while an e-book application is executed, the processor 140 may control the display 120 to display a text having 10 lines on 15 lines with maintaining the layout and the size of the element to the size before the preset size.

In the above-described exemplary embodiment, a layout of an application or a size of an element of the application has been described as being changed according to a change in a display area while a web application is executed. However, this is merely an exemplary embodiment, and a layout of another application or a size of an element of the another application may be changed according to a change in the display area.

For example, if a phone call request is received while the electronic device 100 operates in a first mode, the processor 140 may control the display 120 to display information (e.g., a name, a phone number, etc.) about the party requesting the phone call and a phone call acceptance and/or rejection icon in the display area. Also, if a size of an element increases and then a mode of the electronic device 100 is changed into a second mode according to an increase in the display area caused by a rotation of the roll 115, the processor 140 may control the display 120 to further display the information about the party requesting the phone call, the phone call acceptance and/or rejection icon, and a phone call setting icon (e.g., a video call change icon, a record icon, a speaker icon, etc.) in the display area. Also, if the size of the element increases and then the mode of the electronic device 100 is changed into a third mode according to the increase in the display area caused by the rotation of the roll 115, the processor 140 may control the display 120 to further display the information about the party requesting the phone call, the phone call acceptance and/or rejection icon, the phone call setting icon (e.g., the video call change icon, the record icon, the speaker icon, etc.), and an address book list in the display area.

As another example, if a camera application is executed while the electronic device 100 operates in the first mode, the processor 140 may control the display 120 to display a live-view image and a capture icon in the display area. Also, if the size of the element increases and then the mode of the electronic device 100 is changed into a second mode according to the increase in the display area caused by the rotation of the roll 115, the processor 140 may control the display 120 to further display the live-view image, the capture icon, and a capture setting icon (e.g., a brightness control icon, a flash operate icon, a background setting icon, etc.) in the display area. If the size of the element increases and then the mode of the electronic device 100 is changed into the third mode according to the increase in the display area caused by the rotation of the roll 115, the processor 140 may control the display 120 to further display the live-view image, the capture icon, the capture setting icon, and a list including previously captured images in the display area.

In other words, the processor 140 may control the display 120 to add and display various types of elements as the display area increases while various types of applications are executed.

Figure 7:
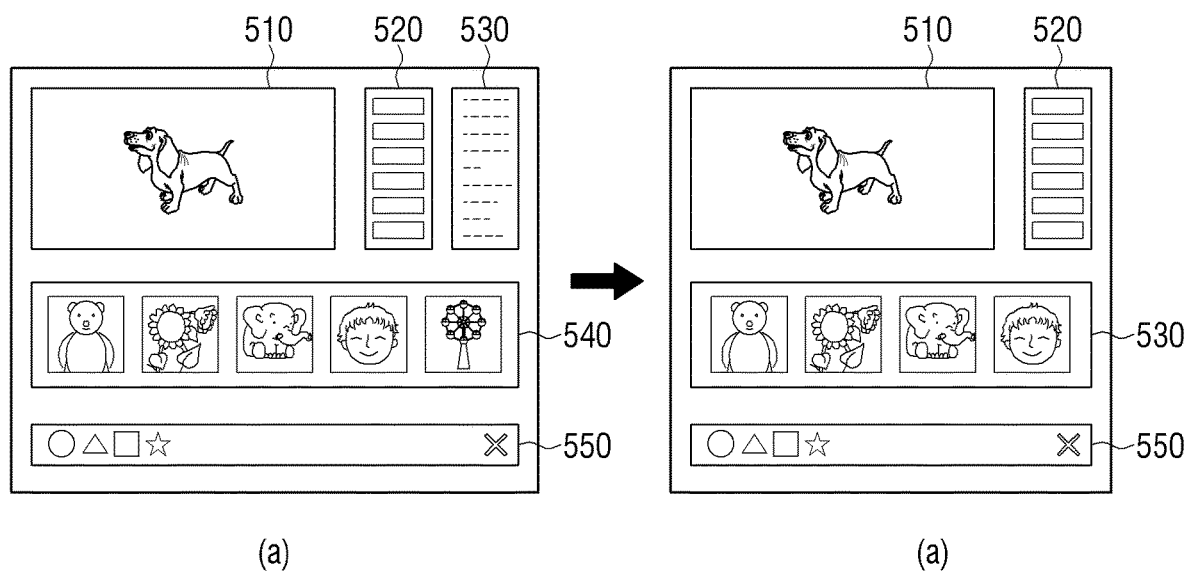

FIG. 7 illustrates removing of an element from a screen if a display area decreases, according to another aspect of an exemplary embodiment.

In detail, as shown in drawing (a) of FIG. 7, the processor 140 may control the display 120 to display a screen including a plurality of elements 510, 520, 530, 540, and 550. For example, the processor 140 may control the display 120 to display an execution screen of a web application including a photo content 510, a hyperlink list 520, a text 530, a content list 540, and a system control box 550. In particular, the screen shown in drawing (a) of FIG. 7 may have an area of 80% of a whole screen size. Here, the processor 140 may control the display 120 to display the photo content 510 on an upper left side of the screen, the hyperlink list 520 on an upper center of the screen, the content list 540 on a middle part of the screen, and the system control box 550 on a lower part of the screen. In particular, a layout of a web application shown in drawing (a) of FIG. 7 may be a second layout of the web application.

Also, if the display area decreases by a rotation of the roll 115 that is performed according to a rolling interaction of a user, the processor 140 may control 120 to remove the text 530 from a plurality of elements and to display the other elements. Here, a removed element may be determined according a priority order or a location thereof. For example, the removed element may be an element having a low priority order or may be an element located on a side of the screen.

The processor 140 may also control the display 120 so as to enable the removed element to gradually disappear according to the display area that decreases.

Also, the processor 140 may control the display 120 to maintain sizes of the elements 510, 520, 540, and 550 although the display area decreases. For example, when the size of the display area decreases from 80% of a maximum size screen to 60% of the maximum size screen, the processor 140 may control the display 120 to maintain the sizes of the other elements 510, 520, 540, and 550.

Also, the processor 140 may control the display 120 to decrease the sizes of some elements without maintaining the sizes of all of the other elements displayed in the display area. For example, when the display area decreases, the processor 140 may control the display 120 to maintain the sizes of contents displayed in a center of the screen and to decrease the sizes of menus displayed on a side of the screen.

The processor 140 may also control the display 120 to maintain locations of other elements displayed in the display area.

If the size of the display area decreases and then decreases to be lower than a preset first size (e.g., 60% of the maximum screen size) by a rotation of the roll 115 that is performed according to a rolling interaction of the user, the processor 140 may control the display 120 to change and display a layout by changing the locations of the other elements. As shown in drawing (b) of FIG. 7, the processor 140 may control the display 120 to display the photo content 510 on the upper left side of the screen, display the hyperlink list 520 on the upper right side of the screen, and re-display the text 530, which is removed, on the lower part of the screen. Also, the processor 140 may control the display 120 to remove the content list 540 and the system control box 550, which are displayed, from the screen.

In other words, as described above with reference to drawings (a) and (b) of FIG. 7, if the display area decreases according to the rotation of the roll 115, the processor 140 decreases the sizes of elements included in the screen to the preset first size. However, this is merely an exemplary embodiment, and even if the display area decreases to the preset first size, the processor 140 may control the display 120 to remove at least one from a plurality of elements included in the screen and display the other elements.

Figure 8:
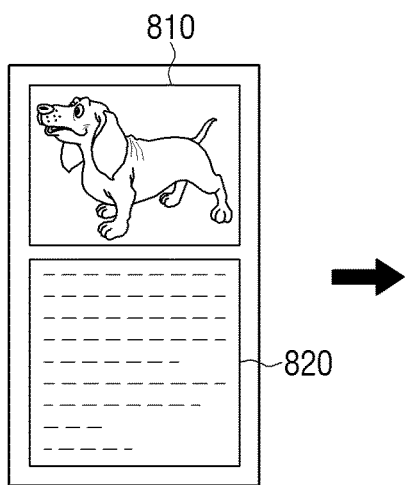
Figure 8:
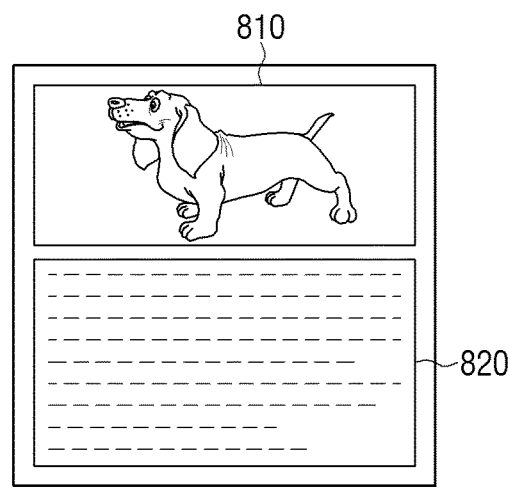
Figure 8:
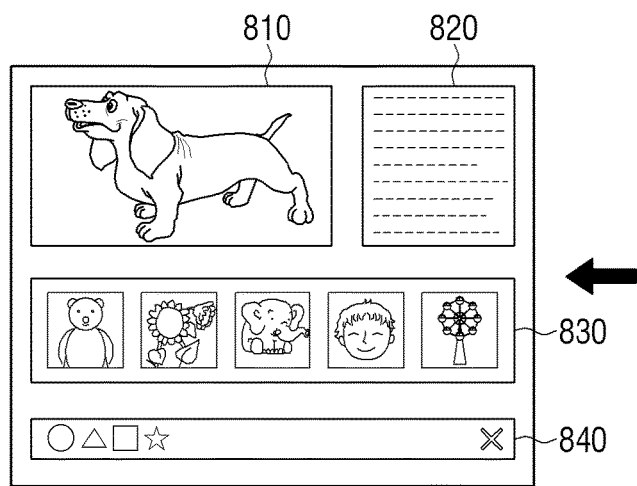
Figure 8:
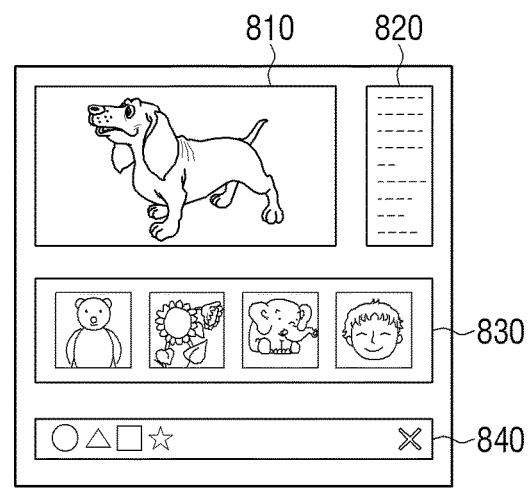

FIG. 8 illustrates a method of displaying a screen according to a change in a display area when an unrolling interaction is continuously input, according to an aspect of an exemplary embodiment.

In detail, referring to drawing (a) of FIG. 8, the processor 140 may control the display 120 to display a screen including a plurality of elements 810 and 820. For example, as shown in drawing (a) of FIG. 8, the processor 140 may control the display 120 to display an execution screen of a web application including a photo content 810 and a text 820. In particular, the screen shown in drawing (a) of FIG. 8 may have an area of 40% of a whole screen size. Here, the processor 140 may control the display 120 to display the photo content 810 on an upper part of the screen and the text 820 on a lower part of the screen. In particular, a layout where the photo content 810 is displayed on the upper part of the screen, and the text 820 is displayed on the lower part of the screen may be a first layout of the web application.

Also, if the display area increases by a rotation of the roll 115 that is performed according to an unrolling interaction of a user, the processor 140 may control the display 120 to maintain the first layout and increase sizes of the plurality of elements 810 and 820 as shown in drawing (b) of FIG. 8.

Here, the processor 140 may control the display 120 to increase the sizes of the plurality of elements 810 and 820 in proportion to the display area that increases according to the rotation of the roll 115. For example, if a size of the display area increases from 40% of a maximum size screen to 50% of the maximum size screen, the processor 140 may control the display 120 to increase the sizes of the elements 810 and 820 by a factor of 1.2.

Also, the processor 140 may control the display 120 to display the screen in a whole area of the display area without maintaining a picture ratio. In other words, if a vertical length of the display area is kept, and only a horizontal length of the display area increases, the processor 140 may change the picture ratio into a ratio of the increased horizontal length and increase the sizes of the elements 810 and 820.

If the size of the display area increases and then exceeds a predefined size (e.g., 60% of the maximum screen size) by the rotation of the roll 115 that is performed according to the unrolling interaction of the user, the processor 140 may control the display 120 to change and display the layout of the web application as shown in drawing (c) of FIG. 8. In detail, as shown in drawing (c) of FIG. 8, the processor 140 may control the display 120 to display the photo content 810 on an upper left side of the screen, and move the text 820, which is displayed on the lower part of the screen, to an upper right side of the screen and display the text 820 on the upper right side of the screen. Also, the processor 140 may control the display 120 to display a content list 830 as a new element in a middle part of the screen and a system control box 840 as a new element on the lower part of the screen.

In other words, the processor 140 may change the layout by changing a location of an existing element or adding a new element. Also, if the display area continuously increases by a rotation of the roll 115 after the layout of the screen is changed into a second layout, the processor 140 may control the display 120 to maintain the layout of the screen in the second layout and increase sizes of at least one elements 810, 820, 830, and 840 included in the screen.

In other words, as described in the previous exemplary embodiment, when a display increases to a preset size, a layout is changed. However, in the present exemplary embodiment, a size into which an image is changed may be additionally preset between particular sizes, and when the image has a predefined size, a layout of the image may be changed.

Figure 9:
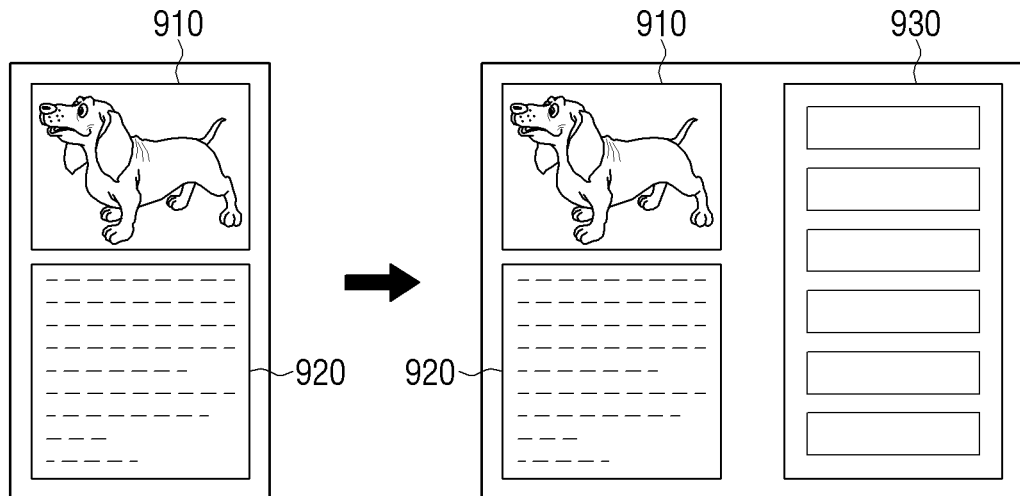

FIG. 9 illustrates determining whether a layout of an execution screen of an application is changed according to an orientation of the electronic device 100, according to an aspect of an exemplary embodiment.

In detail, referring to drawing (a) of FIG. 9, the processor 140 may control the display 120 to display a screen including a plurality of elements 910 and 920. For example, as shown in drawing (a) of FIG. 9, the processor 140 may control the display 120 to display an execution screen of a web application including a photo content 910 and a text 920. In particular, the screen shown in drawing (a) of FIG. 9 may have an area of 40% of a whole screen size. Here, the processor 140 may control the display 120 to display the photo content 910 on an upper part of the screen and the text 920 on a lower part of the screen. In particular, a layout where the photo content 910 is displayed on the upper part of the screen, and the text 920 is displayed on the lower part of the screen may be a first layout of the web application.

Also, if a rotation of the roll 115 that is performed according to an unrolling interaction of a user is sensed, the processor 140 may sense an orientation of the electronic device 100 through the sensor 130. Here, the processor 140 may determine a mode of the electronic device 100 as a horizontal mode (e.g., a landscape mode) or a vertical mode (e.g., a portrait mode) according to the orientation of the electronic device 100.

Also, if a size of a display area exceeds a preset first size by the rotation of the roll 115 according to the unrolling interaction of the user in the horizontal mode, the processor 140 may control the display 120 to change the layout into a new layout by adding a content list 930 as a new element as shown in drawing (b) of FIG. 9. In other words, the processor 140 may change the layout of the web application from the first layout into a second layout.

However, if the size of the display area exceeds the preset first size by the rotation of the roll 115 that is performed according to the unrolling interaction of the user in the vertical mode, the processor 140 may control the display 120 to maintain the layout of the screen and display more contents of the text 920 that is an existing element. In other words, if the text 920 is displayed on 7 lines as shown in drawing (a) of FIG. 9, the processor 140 may control the display 120 to display the text 920 on 12 lines as shown in drawing (c) of FIG. 9.

In other words, the processor 140 may determine whether the layout is changed according to the orientation of the electronic device 100.

In the above-described exemplary embodiment, the change in the layout is determined according to the orientation of the electronic device 100. However, this is merely an exemplary embodiment, and a method of changing the layout may be changed according to the orientation of the electronic device 100.

In detail, if the size of the display area exceeds the preset first size by the rotation of the roll 115 that is performed according to the unrolling interaction of the user while maintaining the horizontal mode, the processor 140 may control the display 120 to change the layout of the screen from the first layout into the second layout. Also, if the size of the display area exceeds the preset first size by the rotation of the roll 115 that is performed according to the unrolling interaction of the user while maintaining the vertical mode, the processor 140 may control the display 120 to change the layout of the screen from the first layout into a third layout.

Figure 10:
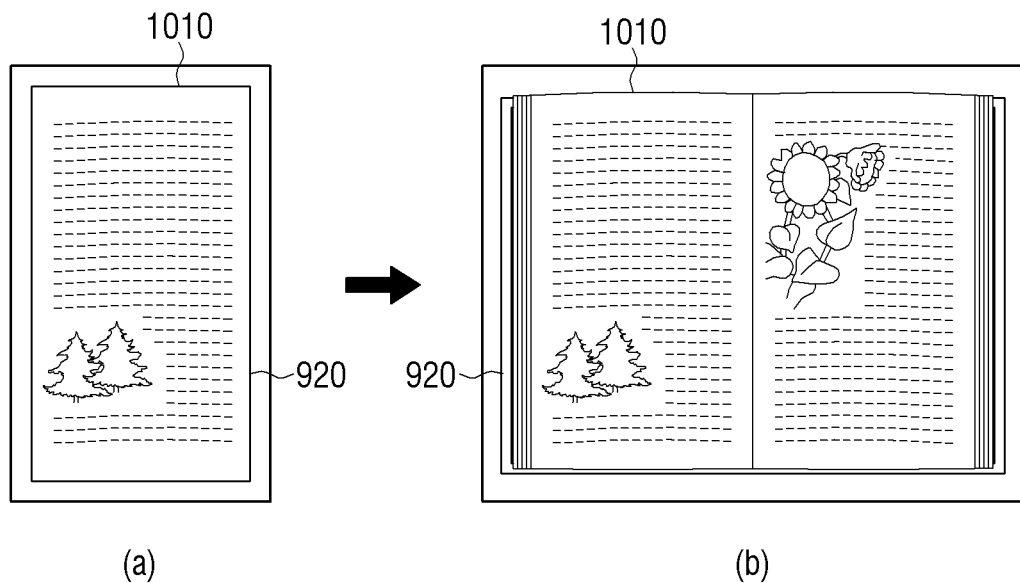
Figure 10:
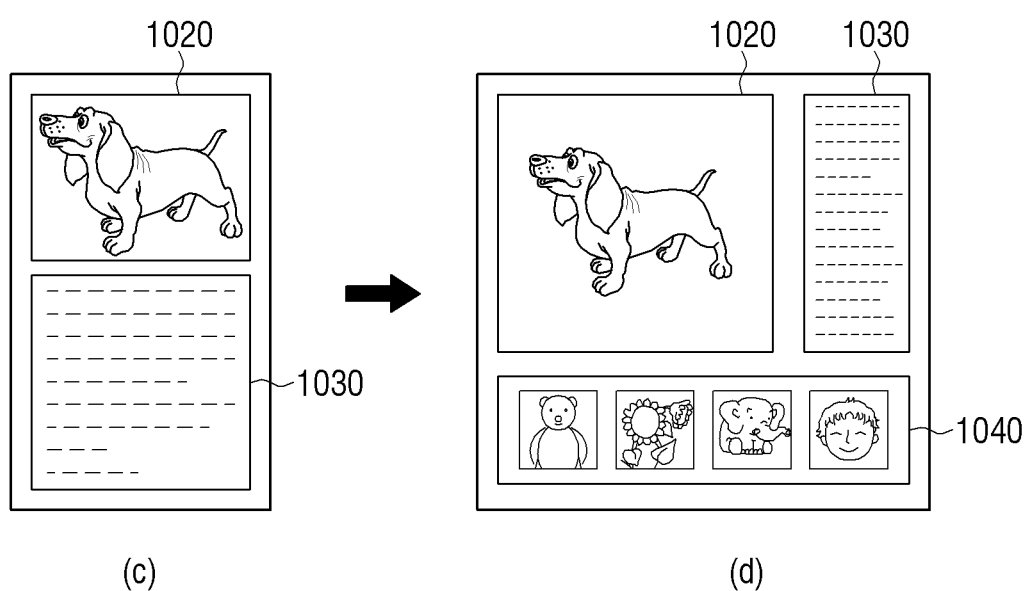

FIG. 10 illustrates determining whether a layout of an execution screen of an application is changed according to a type of executed content, according to an aspect of an exemplary embodiment.

In detail, referring to drawing (a) of FIG. 10, the processor 140 may control the display 120 to display a screen including one element 1010. For example, as shown in drawing (a) of FIG. 9, the processor 140 may control the display 120 to display an execution screen of an e-book application including a text 1010.

Also, if the size of the display area exceeds the preset first size by the rotation of the roll 115 that is performed according to the unrolling interaction of the user while the e-book application is executed, the processor 140 may control the display 120 to display more contents of the text 1010, which is an existing element, than existing contents of the text 1010 as shown in drawing (b) of FIG. 10.

In other words, although the size of the display area exceeds the preset first size while the e-book application is executed, the processor 140 may control the display 120 to maintain the layout and display more contents of an existing element.

However, referring to drawing (c) of FIG. 10, the processor 140 may control the display 120 to display a screen including a plurality of elements 1020 and 1030. For example, as shown in drawing (c) of FIG. 10, the processor 140 may control the display 120 to display an execution screen of a web application including a photo content 1020 and a text 1030.

Also, if the size of the display area exceeds the preset first size by the rotation of the roll 115 that is performed according to the unrolling interaction of the user while the web application is executed, the processor 140 may control the display 120 to change a location of the text 1030 as an existing element, and to add and display a content list 1040 as a new element as shown in drawing (d) of FIG. 10.

In other words, if the size of the display area exceeds the preset first size while the web application is executed, the processor 140 may control the display 120 to change the layout of the screen from a first layout into a second layout.

In other words, the processor 120 may determine whether the layout is changed according to a type of an application that is currently being executed.

In the above-described exemplary embodiment, although the size of the display area exceeds the preset first size, an e-book application is described as an application of which layout is not changed. However, this is merely an exemplary embodiment, and although the display area exceeds the preset first size, a layout of another application (e.g., a moving image application, a gallery application, or the like) providing one content may also not be changed.

Also, in the above-described exemplary embodiment, if the size of the display area exceeds the preset first size, a web application is described as an application of which layout is changed. However, this is merely an exemplary embodiment, and although the size of the display area exceeds the preset first size, a layout of another application (e.g., a camera application, a phone application, or the like) may also be changed.

In addition, in the above-described exemplary embodiment, a change in a layout is determined according to a type of an application that is currently being executed. However, this is merely an exemplary embodiment, and a method of changing the layout may be changed according to a type of an executed application.

In detail, if the size of the display area exceeds the preset first size by the rotation of the roll 115 that is performed according to the unrolling interaction of the user while a first application is executed, the processor 140 may control the display 120 to change the layout of the screen from the first layout into the second layout. Also, if the size of the display area exceeds the preset first size by the rotation of the roll 115 that is performed according to the unrolling of the user while a second application is executed, the processor 140 may control the display 120 to change the layout of the screen from the first layout into the third layout.

Also, in the above-described exemplary embodiment, a change in a layout and a method of changing the layout are changed according to a type of an application that is currently executed. However, this is merely an exemplary embodiment, and the change in the layout and the method of changing the layout may be changed according to a currently displayed content type.

Figure 11:
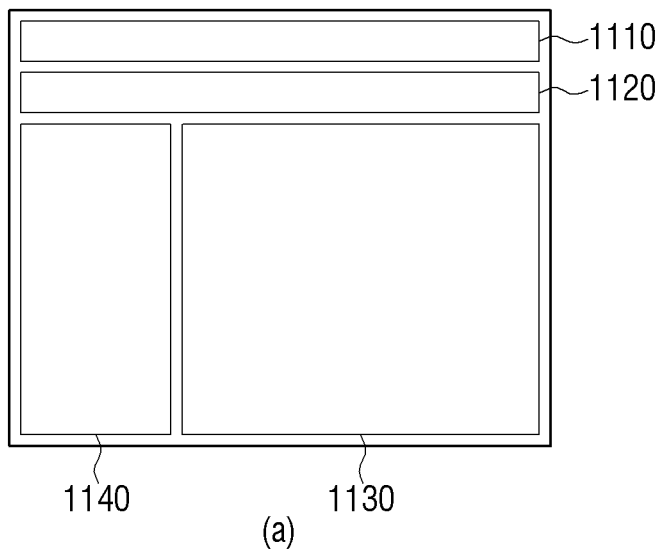
Figure 11:
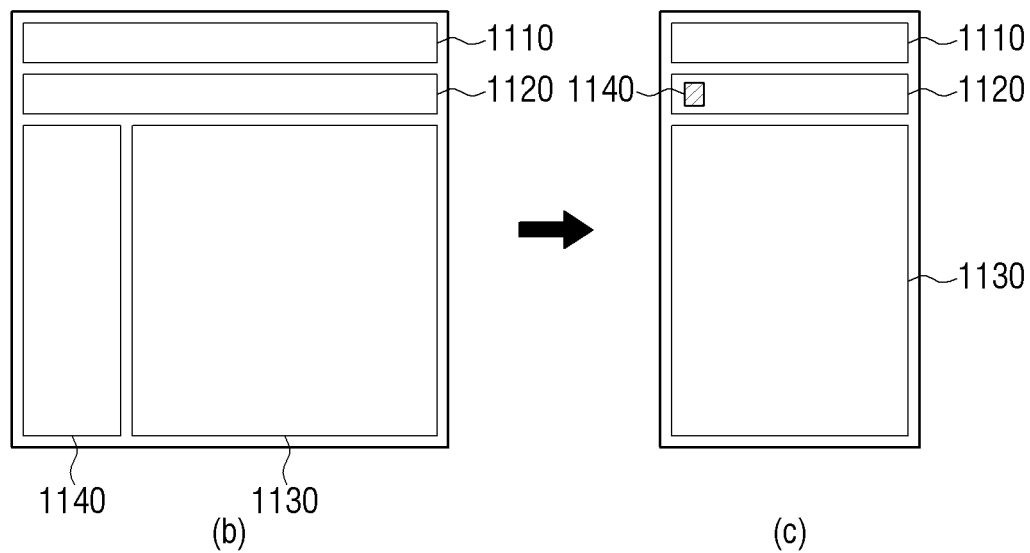

FIG. 11 illustrates a method of changing a layout according to priority orders of elements, according to an aspect of an exemplary embodiment.

Referring to drawing (a) of FIG. 11, the processor 140 may control the display 120 to display a screen including a plurality of elements 1110, 1120, 1130, and 1140. For example, as shown in drawing (a) of FIG. 11, the processor 140 may control the display 120 to display an application execution screen including a system bar 1110, an application bar 1120, a content area 1130, and a side navigation area 1140.

In particular, the screen shown in drawing (a) of FIG. 11 may have an area of 90% of a whole screen size. Here, the processor 140 may control the display 120 to display the system bar 1110 and the application bar 1120 on an upper part of the screen, the content area 1130 on a lower right side of the screen, and the side navigation area 1140 on a lower left side. In particular, a layout shown in drawing (a) of FIG. 11 may be referred to as a first layout of a web application.

Also, if a display area decreases by a rotation of the roll 115 that is performed according to a rolling interaction of a user, the processor 140 may control the display 120 to maintain the first layout and decrease sizes of the plurality of elements 1110, 1120, 1130, and 1140 as shown in drawing (b) of FIG. 11.

Here, the processor 140 may control the display 120 to decrease the sizes of the plurality of elements 1110, 1120, 1130, and 1140 in proportion to the display area that decreases according to the rotation of the roll 115. For example, if a size of the display area decreases from 90% of a maximum size screen to 70% of the maximum size screen, the processor 140 may control the display 120 to decrease the sizes of the elements 1110, 1120, 1130, and 1140 by 22.2%.

The processor 140 may also control the display 120 to display the screen in a whole area of the display area without maintaining a picture ratio. In other words, if a vertical length of the display area is kept, and a horizontal length of the display area decreases, the processor 140 may change the picture ratio into a ratio of the decreased horizontal length and increase the sizes of the elements 1110, 1120, 1130, and 1140.

Also, the processor 140 may adjust a method of decreasing the size of an element displayed in the display area according to a priority order thereof. In detail, the system bar 1110 or the application bar 1120 having a high priority order may decrease so as to decrease display intervals between icons displayed in the system bar 1110 or the application bar 1120. The side navigation area 1140 having a low priority order may decrease so as to decrease the number of icons included in the side navigation area 1140.

If the size of the display area decreases to be lower than a preset first size (e.g., 60% of a maximum screen size) by a rotation of the roll 1150 that is performed according to the rolling interaction of the user, the processor 140 may control the display 120 to change and display the layout. In detail, as shown in drawing (c) of FIG. 11, the processor 140 may control the display 120 to maintain locations of the system bar 1110, the application bar 1120, and the content area 1130 or decrease the sizes of the system bar 1110, the application bar 1120, and the content area 1130 and to make the side navigation area 1140 displayed on the lower left side of the screen into an icon and to display the side navigation area 1140 in the application bar 1120.

In particular, when the layout is changed, the processor 140 may change the layout according to the priority orders of the elements on the screen.

A display location of the system bar 1110 having a first priority order may be kept all the time. Also, when a size of the system bar 1110 decreases, display intervals of icons included in the system bar 1110 may decrease.

A display location of the application bar 1120 having a second priority order may be kept all the time, but an amount of contents included in the application bar 1120 may be changed according to a size of the application bar 1120. For example, content title information may be included in the application bar 1120 in the first layout, but content titles and content detailed information may be included in the application bar 1120 in the second layout. Also, more icons may be included in the application bar 1120 having the second layout than the application bar 1120 having the first layout. In addition, the application bar 1120 having the first layout may provide one depth menu, where the application bar 1120 having the second layout may simultaneously provide several depth menus.

The content area 1130 having a third priority order may be enlarged or reduced contents according to a change in the display area. If a content includes a plurality of pages, several pages may be displayed on one screen with an increase in the size of the screen, where only some of the pages may be displayed on the screen with a decrease in the size of the screen. Also, if the content area 1130 includes a content list including thumbnails of a plurality of contents, the number of thumbnails included in the content list may be adjusted according to a size of the screen. A location of the content area 1130 may be changed according to the size of the display area.

The side navigation area 1140 having a fourth priority order may not be displayed on the screen according to a layout. In detail, if the display area is small, the side navigation area 1140 may not be displayed on the screen but may be displayed as an additional icon form on the screen. In other words, if an icon is selected, the side navigation area 1140 may be displayed. If the display area is large, the side navigation area 1140 may be displayed on a side of the screen.

As described above, the processor 140 may change the layout by using different methods according to priority orders of elements when the layout is changed.

According to another exemplary embodiment, if a screen includes a main content, a sub content, and icons, the main content may be an element having a first priority order, the sub content may be an element having a second priority order, and the icons may be elements having a third priority order. Although a layout decreases, a size of the main content that is the element having the first priority order may decrease but a location of the main content may be kept all the time. The sub content that is the element having the second priority order may be displayed in a particular area in a layout including a large display area but may be displayed according to a user selection in a layout including a small display area. The number and locations of icons that are the element having the third priority order may be changed according to the layout.

Figure 12:
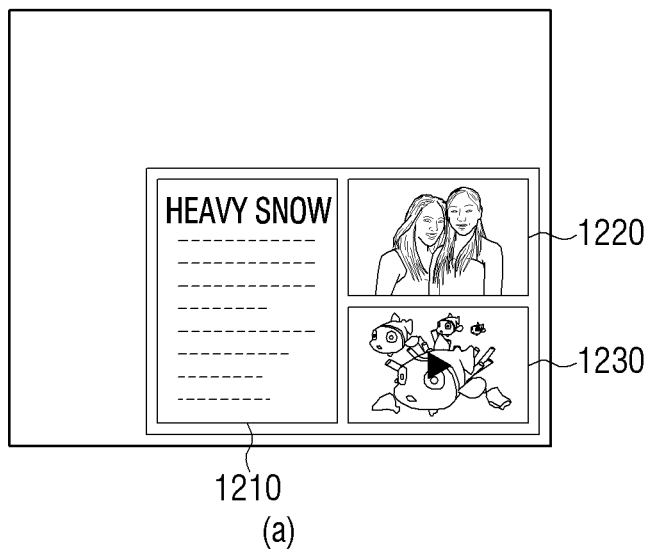
Figure 12:
Figure 12:
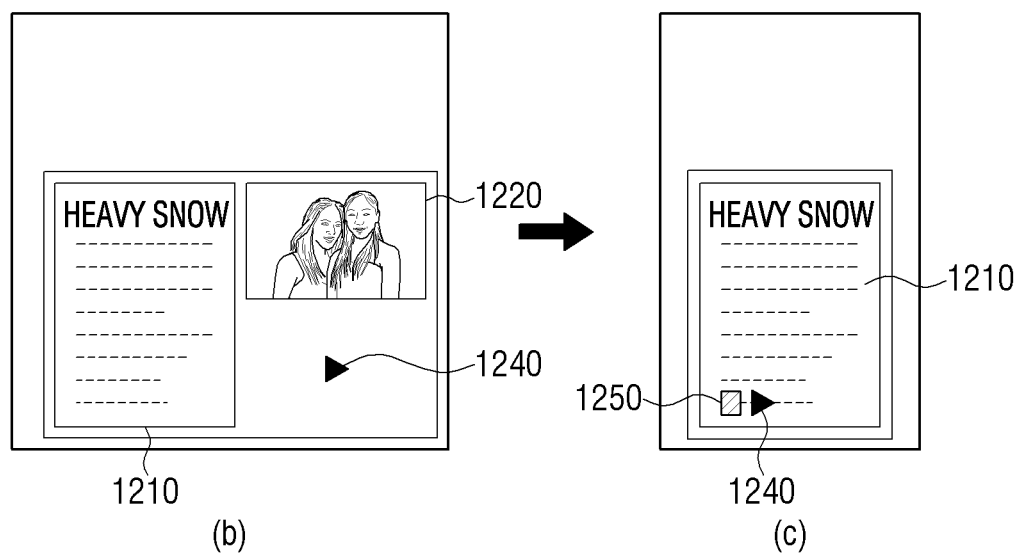

FIG. 12 illustrates a method of changing a layout according to priority orders of elements, according to another aspect of an exemplary embodiment. Here, the elements may include a plurality of contents.

Referring to drawing (a) of FIG. 12, the processor 140 may control the display 120 to display a screen including a plurality of elements 1210, 1220, and 1230. For example, as shown in drawing (a) of FIG. 12, the processor 140 may control the display 120 to display an application execution screen including an article content 1210 having a text form, an image content 1220, and a moving image content 1230. Here, a layout of drawings (a)-(c) of FIG. 12 may be referred to as a first layout of an application screen.

Also, if a size of a display area becomes smaller and thus is changed into a second layout while maintaining a first layout, the processor 140 may control the display 120 to decrease sizes of the article 1210 and the image content 1220, to change the moving image content 1230 into a moving image icon 1240, and to display the moving image icon 1240 as shown in drawing (b) of FIG. 12.

If the size of the display area becomes smaller and thus is changed into a third layout while maintaining the second layout, the processor 140 may control the display 120 to decrease the size of the article content 1210, and to move and display an image icon 1250 corresponding to the image content 1220 and the moving image icon 1240 corresponding to the moving image content 1230 into the article content 1210 as shown in drawing (c) of FIG. 12.

In other words, the processor 140 may not change a display location of the article content 1210 having a first priority order among elements included in the screen, reduce and provide the image content 1220 having a second priority order among the elements included in the screen to an icon merely in the third layout, reduce and provide the moving image content 1230 having a third priority order to an icon from the second layout, and may omit the moving image content 1230.

Figure 13:
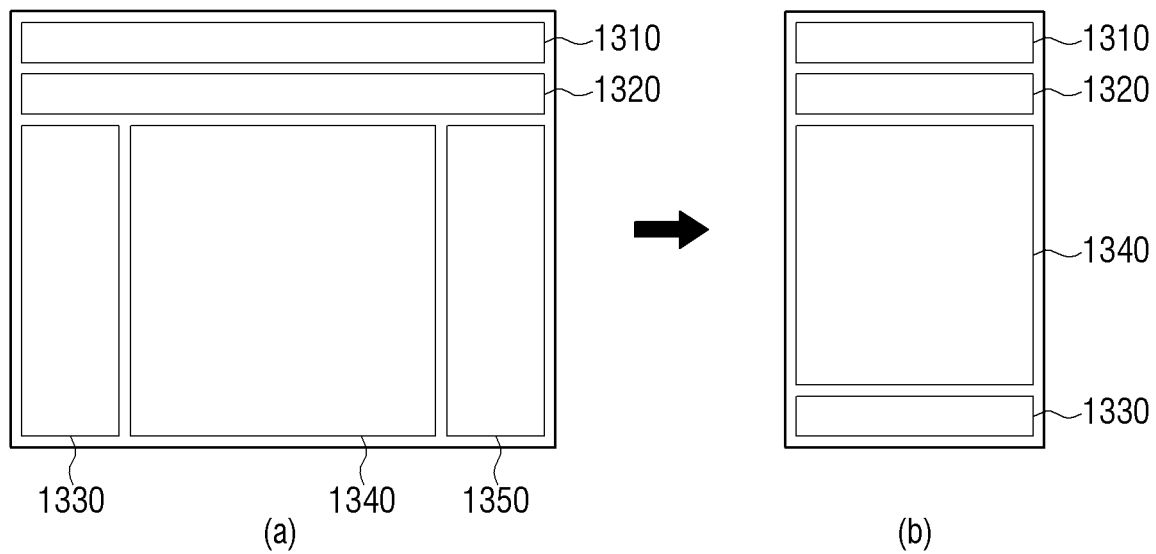

FIG. 13 illustrates a method of changing a layout according to priority orders of elements, according to an aspect of an exemplary embodiment.

Referring to drawing (a) of FIG. 13, the processor 140 may control the display 120 to display a screen including a plurality of elements 1310, 1320, 1330, 1340, and 1350. For example, as shown in drawing (a) of FIG. 11, the processor 140 may control the display 120 to display an application execution screen including a system bar 1310, an application bar 1320, a content area 1340, a first side navigation area 1330, and a second side navigation area 1350.

Here, the system bar 1310, the application bar 1320, and the content area 1340 may be elements having first priority orders, the first side navigation area 1330 may be an element having a second priority order, and the second side navigation area 1350 may be an element having a third priority order.

Also, if a size of a display area decreases and then decreases to be lower than a preset size (e.g., 60% of a maximum screen size) by a rotation of the roll 155 that is performed according to rolling interaction of a user, the processor 140 may control the display 120 to change and display a layout of an application screen as shown in drawing (b) of FIG. 13.

In detail, display locations of the system bar 1310, the application bar 1320, and the content area 1340 having the first priority orders among the elements included in the screen may not be changed. Also, a display area of the first side navigation area 1330 having the second priority order among the elements included in the screen may be changed according to a change in the size of the display area. The second side navigation area 1350 having the third priority order among the elements included in the screen may be deleted according to the change in the size of the display area.

In other words, as described above, locations, sizes, and existences of elements included in a screen may be determined by using different methods when changing a layout according to priority orders of the elements.

FIG. 14 is a flowchart of a method of controlling an electronic device, according to an aspect of an exemplary embodiment. Here, the electronic device 100 may include a rollable display as described with reference to FIGS. 1 through 4.

In operation S1410, the electronic device 100 senses a change in a size of a display area according to a rotation of the roll 115.

In operation S1420, the electronic device 100 may change one of a size and a layout of an element included in a screen according to the changed size.

In detail, if the display area increases by the rotation of the roll 115, the electronic device 100 may increase a size of at least one element included in the screen when the size of the display area is a preset first size. If the size of the display area exceeds the preset first size, the electronic device 100 may change a layout of the screen from a first layout into a second layout. Also, if the display area decreases by the rotation of the roll 115 after the layout of the screen is changed into the second layout, the electronic device 100 may maintain the layout of the screen in the second layout and decrease a size of at least one element included in the screen when the size of the display area is the preset first size. If the size of the display area becomes smaller than the preset first size, the electronic device 100 may change the layout of the screen from the second layout to a first layout. Here, the second layout may be a layout where an element is added to the first layout, i.e., wherein the first layout is a subcomponent of the second layout.

As described above, an electronic device including a rollable display may adjust or change a size of an element according to a change in a display area so as to enable a user to view an optimum screen according to the changed size of the display area.

FIG. 15 illustrates providing zoom-in and/or zoom-out functions according to an extension of a display area, according to another aspect of an exemplary embodiment.

The processor 140 may provide zoom-in and/or zoom-out functions according to a change in the display area. In detail, if the display area increases according to an unrolling interaction, the processor 140 may provide the zoom-in function of zooming in an image displayed in the display area. Also, if the display area decreases according to a rolling interaction, the processor 140 may provide the zoom-out function of zooming out the image displayed in the display area.

In detail, as shown in drawing (a) of FIG. 15, if a size of the display area is a first size, the processor 140 may control the display 120 to display a first image 1510. As shown in drawing (b) of FIG. 15, if the display area increases to a second size according to an unrolling interaction, the processor 140 may control the display 120 to display a second image 1520 of which magnification is enlarged more than the first image 1510. Also, as shown in drawing (c) of FIG. 15, if the display area increases to a third size according to an unrolling interaction, the processor 140 may control the display 120 to display a third image 1530 of which magnification is enlarged more than the second image 1520.

The second image 1520 may be an image that is formed by cropping, enlarging, and zooming in an area of the first image 1510, and the third image 1530 may be an image that is formed by cropping, enlarging, and zooming in an area of the second image 1520.

In particular, the processor 140 may determine a magnification, a picture ratio of an unrolled display, and a cropped location of an image to crop an area from the first image 1510. The processor 140 may enlarge the image so as to increase the magnification in proportion to an unrolled degree of a display. For example, if the display is unrolled by about 2 cm, the processor 140 may enlarge the image by a factor of 2. If the display is unrolled by about 4 cm, the processor 140 may enlarge the image by a factor of 4. Also, when the processor 140 enlarges the image, the processor 140 may crop the image in consideration of the picture ratio of the unrolled display. For example, if the display is unrolled so as to enable the picture ratio to be changed from 4:3 to 16:9, the processor 140 may crop an original image at the picture ratio of 16:9 and provide the cropped image. Also, the processor 140 may determine an area, which is to be cropped, based on at least one selected from a center of the image, a location selected by a user, and an important area determined through an image analysis.

Also, if the processor 140 enlarges and provides the image, the processor 140 may provide a guide user interface (UI) that displays which part of the enlarged image the original image corresponds to. The processor 140 may change an area of the original image that is enlarged and provided according to an input user instruction by using the guide UI. In other words, if the processor 140 drags and moves the guide UI into a new area, the processor 140 may perform the zoom-in function of enlarging the new area.

According to an aspect of an exemplary embodiment, if the display area of the display 120 is changed according to a rolling and/or unrolling interaction, the processor 140 may operate along with a change in the displayed display area to provide an optical zoom function of controlling a barrel of a camera to move.

In other words, if a housing of the electronic device 100 slides, and thus a horizontal length of the housing increases when the display 120 is unrolled, a length of the barrel connected to the housing may increase according to a sliding motion of the housing. Therefore, the optical zoom function may be provided.

In the above-described exemplary embodiment, a zoom-in function is provided with an increase in a display area. However, this is merely an exemplary embodiment, and a zoom-out function may be provided according to a decrease in the display area.

An apparatus (e.g., modules or the electronic device 100) or a method (e.g., operations) according to various exemplary embodiments may be performed by at least one computer (e.g., the processor 140) that executes instructions included in at least one of programs maintained on a computer-readable storage medium.

If the instructions are executed by a computer (e.g., the processor 140), the at least one computer may perform functions corresponding to the instructions. Here, the computer-readable medium may, for example, be the memory 150.

A program may, for example, be included on a computer-readable medium such as a hard disc, a floppy disc, a magnetic medium (e.g., a magnetic tape), an optical medium, (e.g., a compact disc read only memory (CD-ROM), a digital versatile disc (DVD), a magneto-optical medium (e.g., a floptical disc), a hardware device (e.g., a ROM, a random access memory (RAM), a flash memory, or the like), or the like. In this case, a storage medium may be included as a part of components of the electronic device 100 but may be installed through a port of the electronic device 100. Alternatively, the storage medium may be included in an external device (e.g., a cloud, a server, or another electronic device) located outside the electronic device 100. Also, the program may be divided and then stored on a plurality of storage media. Here, at least some of the plurality of storage medium may be located outside the electronic device 100.

The instructions may include machine language codes that are made by a compiler and high-level language codes that may be executed by a computer by using an interpreter or the like. The above-described hardware device may be configured to operate as one or more software modules so as to perform operations of various exemplary embodiments, and an opposite case is the same.

The foregoing exemplary embodiments and advantages are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. An electronic device comprising:
a housing;
a roll at least partially contained in the housing;
a display configured to be rolled on the roll, the display comprising a display area having a size that changes according to a rotation of the roll;
a sensor configured to sense the size of the display area; and
a processor electrically connected to the display and the sensor,
wherein the processor is configured to, control the display to display a plurality of elements on a screen, types of the plurality of elements being different from each other, based on the size of the display area decreasing by the rotation of the roll and being equal to or more than a preset size, control the display to decrease a size of the plurality of elements on the screen based on the size of the display area, and, based on the size of the display area decreasing by the rotation of the roll and being less than the preset size, control the display to delete a first element of the plurality of elements and increase a size of a second element of the plurality of elements, the first element being of a first type among the types of the plurality of elements and the second element being of a second type different from the first type among the types of the plurality of elements.

2. The device as claimed in claim 1, wherein the processor is further configured to, based on the size of the display area decreasing by the rotation of the roll being equal to or more than the preset size, control the display to display the plurality of elements after changing the size of the plurality of elements as locations and number of the plurality of elements are maintained.

3. The device as claimed in claim 1, wherein the processor is further configured to, based on the size of the display area decreasing by the rotation of the roll and being less than the preset size, control the display to, after deleting the first element of the plurality of elements, change a location of the second element of the plurality of elements.

4. The device as claimed in claim 3, wherein the processor is further configured to, based on the size of the display area decreasing by the rotation of the roll and being less than the preset size, control the display to delete the first element of the plurality of elements and change the location of the second element of the plurality of elements according to priority orders of the first element and the second element.

5. The device as claimed in claim 1, wherein the processor is further configured to, based on the size of the display area decreasing by the rotation of the roll and being equal to or more than the preset size, control the display to maintain a size of an element among the plurality of elements and decrease a size of another element among the plurality of elements.

6. A method of controlling an electronic device comprising a housing, a roll at least partially contained in the housing, and a display configured to be rolled on the roll, the display comprising a display area having a size that changes according to a rotation of the roll, the method comprising:

sensing the change in the size of the display area according to the rotation of the roll;

displaying a plurality of elements on a screen, types of the plurality of elements being different from each other;

based on the size of the display area decreasing by the rotation of the roll and being equal to or more than a preset size, decreasing a size of the plurality of elements on the screen based on the size of the display area; and based on the size of the display area decreasing by the rotation of the roll and being less than the preset size, deleting a first element of the plurality of elements and increasing a size of a second element of the plurality of elements, the first element being of a first type among the types of the plurality of elements and the second element being of a second type different from the first type among the types of the plurality of elements.

7. The method as claimed in claim 6, wherein the decreasing comprises, based on the size of the display area decreasing by the rotation of the roll and being equal to or more than the preset size, controlling the display to display the plurality of elements after changing the size of the plurality of elements as locations and number of the plurality of elements are maintained.

8. The method as claimed in claim 6, wherein the deleting changing of the size of the second element comprises, based on the size of the display area decreasing by the rotation of the roll and being less than the preset size, changing a location of the second element of the plurality of elements.

9. The method as claimed in claim 8, wherein based on the size of the display area decreasing by the rotation of the roll and being less than the preset size, the first element of the plurality of elements is deleted and the location of the second element of the plurality of elements is changed according to priority orders of the first element and the second element.

10. The method as claimed in claim 6, wherein the decreasing comprises, based on the size of the display area decreasing by the rotation of the roll and being equal to or more than the preset size, controlling the display to maintain a size of an element among the plurality of elements and decrease a size of another element among the plurality of elements.

* * * * *